US011390123B2

(12) United States Patent
Sekine et al.

(10) Patent No.: US 11,390,123 B2
(45) Date of Patent: Jul. 19, 2022

(54) PNEUMATIC TIRE

(71) Applicant: The Yokohama Rubber Co., LTD., Tokyo (JP)

(72) Inventors: Katsuyoshi Sekine, Hiratsuka (JP); Yuji Kodama, Hiratsuka (JP); Noboru Kuwahara, Hiratsuka (JP)

(73) Assignee: The Yokohama Rubber Co., LTD., Tokyo (JP)

( * ) Notice: Subject to any disclaimer, the term of this patent is extended or adjusted under 35 U.S.C. 154(b) by 590 days.

(21) Appl. No.: 15/761,416

(22) PCT Filed: Sep. 13, 2016

(86) PCT No.: PCT/JP2016/077015
§ 371 (c)(1),
(2) Date: Mar. 19, 2018

(87) PCT Pub. No.: WO2017/056976
PCT Pub. Date: Apr. 6, 2017

(65) Prior Publication Data

US 2020/0231011 A1 Jul. 23, 2020

(30) Foreign Application Priority Data

Oct. 1, 2015 (JP) ............................ JP2015-196025

(51) Int. Cl.
*B60C 13/02* (2006.01)
*B60C 11/01* (2006.01)
(Continued)

(52) U.S. Cl.
CPC .............. *B60C 13/02* (2013.01); *B60C 11/01* (2013.01); *B60C 3/04* (2013.01); *B60C 5/00* (2013.01);
(Continued)

(58) Field of Classification Search
CPC .............................. B60C 13/001; B60C 13/02
(Continued)

(56) References Cited

U.S. PATENT DOCUMENTS 4,343,342 A * 8/1982 McDonald ............ B60C 13/001 152/523
10,442,251 B2 10/2019 Murata
(Continued)

FOREIGN PATENT DOCUMENTS

EP 0490247 A1 * 6/1992 ........... B60C 13/001
JP 2001-206024 7/2001
(Continued)

OTHER PUBLICATIONS

International Search Report for International Application No. PCT/JP2016/077015 dated Dec. 20, 2016, 4 pages, Japan.

*Primary Examiner* — Timothy Kennedy
*Assistant Examiner* — Farah Taufiq
(74) *Attorney, Agent, or Firm* — Thorpe North & Western

(57) ABSTRACT

A pneumatic tire includes a longitudinal protrusion portion provided on at least one of tire side surfaces located on either side in a tire lateral direction, the longitudinal protrusion portion projecting from the tire side surface and extending along the tire side surface; and serration provided on the tire side surface in a region including an end portion of the longitudinal protrusion portion, the serration being formed of a plurality of small grooves arranged in parallel, and the plurality of small grooves being inclined with respect to a lateral centerline that passes through a center of the longitudinal protrusion portion in a width direction.

15 Claims, 18 Drawing Sheets

TIRE LATERAL DIRECTION
OUTWARD
TIRE RADIAL DIRECTION
INWARD
HW
INWARD IN VEHICLE MOUNTING DIRECTION
OUTWARD IN VEHICLE MOUNTING DIRECTION

(51) Int. Cl.
*B60C 3/04* (2006.01)
*B60C 5/00* (2006.01)
*B60C 15/024* (2006.01)
*B60C 17/00* (2006.01)

(52) U.S. Cl.
CPC ........ *B60C 15/024* (2013.01); *B60C 17/0009* (2013.01); *B60C 2200/06* (2013.01)

(58) Field of Classification Search
USPC .......................................................... 152/523
See application file for complete search history.

(56) References Cited

U.S. PATENT DOCUMENTS

2003/0084979 A1 5/2003 Matsumoto
2007/0034312 A1 2/2007 Matsumoto
2013/0068362 A1* 3/2013 Kudo .................... B60C 13/001 152/450
2013/0075007 A1 3/2013 Fujii et al.
2013/0263992 A1 10/2013 Matsumoto
2014/0027035 A1* 1/2014 Joza ........................ B60C 13/02 152/523
2014/0041782 A1* 2/2014 Kudo ...................... B60C 13/02 152/523
2015/0321523 A1* 11/2015 Takahashi ............. B60C 13/002 152/523

FOREIGN PATENT DOCUMENTS

JP 2013-071649 4/2013
JP 2013-071660 4/2013
JP 2013-216119 10/2013
JP 2015-000613 1/2015
JP 2015013605 A * 1/2015
JP 2015-024722 2/2015
JP 2015024722 A * 2/2015
WO WO 2009/133892 11/2009
WO WO 2014/199731 12/2014

* cited by examiner

| | COMPARATIVE EXAMPLE 1 | COMPARATIVE EXAMPLE 2 | EXAMPLE 1 | EXAMPLE 2 | EXAMPLE 3 |
|---|---|---|---|---|---|
| LONGITUDINAL PROTRUSION PORTION | YES | YES | YES | YES | YES |
| FIRST SERRATION PORTION | NO | YES | YES | YES | YES |
| ANGLE FORMED BY LONGITUDINAL PROTRUSION PORTION AND FIRST SERRATION PORTION | - | 0° | 30° | 30° | 80° |
| SECOND SERRATION PORTION | NO | NO | NO | YES | YES |
| ANGLE FORMED BY LONGITUDINAL PROTRUSION PORTION AND SECOND SERRATION PORTION | - | - | - | 50° | 60° |
| NO-SERRATION REGION | - | NO | NO | YES | YES |
| RECESSED PORTION | NO | NO | NO | NO | NO |
| LONGITUDINAL PROTRUSION PORTION INTERSECTS TIRE CIRCUMFERENTIAL DIRECTION LINE AND TIRE RADIAL DIRECTION LINE | NO | NO | NO | NO | YES |
| ARC SHAPED LONGITUDINAL PROTRUSION PORTION | - | - | - | - | - |
| LONGITUDINAL PROTRUSION PORTION DISPOSED OUTWARD OF TIRE MAXIMUM WIDTH POSITION IN THE TIRE RADIAL DIRECTION | - | - | - | - | - |
| LONGITUDINAL PROTRUSION PORTION DISPOSED INWARD OF TIRE MAXIMUM WIDTH POSITION IN THE TIRE RADIAL DIRECTION | - | - | - | - | - |
| LONGITUDINAL PROTRUSION PORTION WIDTH IS MAXIMUM WIDTH AT CENTRAL PORTION AND SMALLEST WIDTH AT END PORTION | - | - | - | - | - |
| DURABILITY PERFORMANCE (CRACKING RESISTANCE) | 100 | 98 | 101 | 102 | 103 |
| VISIBILITY | 100 | 98 | 102 | 105 | 105 |
| AIR RESISTANCE REDUCING PERFORMANCE | 100 | 100 | 100 | 100 | 100 |

FIG. 20A

| | EXAMPLE 4 | EXAMPLE 5 | EXAMPLE 6 | EXAMPLE 7 | EXAMPLE 8 |
|---|---|---|---|---|---|
| LONGITUDINAL PROTRUSION PORTION | YES | YES | YES | YES | YES |
| FIRST SERRATION PORTION | YES | YES | YES | YES | YES |
| ANGLE FORMED BY LONGITUDINAL PROTRUSION PORTION AND FIRST SERRATION PORTION | 80° | 80° | 80° | 80° | 80° |
| SECOND SERRATION PORTION | YES | YES | YES | YES | YES |
| ANGLE FORMED BY LONGITUDINAL PROTRUSION PORTION AND SECOND SERRATION PORTION | 60° | 60° | 60° | 60° | 60° |
| NO-SERRATION REGION | YES | YES | YES | YES | YES |
| RECESSED PORTION | NO | YES | YES | YES | YES |
| LONGITUDINAL PROTRUSION PORTION INTERSECTS TIRE CIRCUMFERENTIAL DIRECTION LINE AND TIRE RADIAL DIRECTION LINE | YES | YES | YES | YES | YES |
| ARC SHAPED LONGITUDINAL PROTRUSION PORTION | YES | YES | YES | YES | YES |
| LONGITUDINAL PROTRUSION PORTION DISPOSED OUTWARD OF TIRE MAXIMUM WIDTH POSITION IN THE TIRE RADIAL DIRECTION | - | YES | YES | - | - |
| LONGITUDINAL PROTRUSION PORTION DISPOSED INWARD OF TIRE MAXIMUM WIDTH POSITION IN THE TIRE RADIAL DIRECTION | - | - | - | YES | YES |
| LONGITUDINAL PROTRUSION PORTION WIDTH IS MAXIMUM WIDTH AT CENTRAL PORTION AND SMALLEST WIDTH AT END PORTION | - | - | YES | - | YES |
| DURABILITY PERFORMANCE (CRACKING RESISTANCE) | 106 | 103 | 105 | 106 | 106 |
| VISIBILITY | 105 | 105 | 105 | 105 | 105 |
| AIR RESISTANCE REDUCING PERFORMANCE | 100 | 101 | 102 | 101 | 102 |

FIG. 20B

PNEUMATIC TIRE

TECHNICAL FIELD

The present technology relates to a pneumatic tire.

BACKGROUND ART

In the related art, a pneumatic tire is known that is designed to reduce rolling resistance and provide cooling and is provided with grooves and projection portions formed in a side surface. For example, the pneumatic tire described in Japanese Unexamined Patent Publication No. 2013-216119 is designed to improve visibility of markings and reduce rolling resistance and includes serration formed by a plurality of small grooves formed in a sidewall portion, the small grooves having a groove depth that is variable depending on the position in the tire radial direction.

The pneumatic tire described in Japanese Unexamined Patent Publication No. 2001-206024 is designed to reduce road noise and includes a plurality of protrusion lines having the same shape formed on a sidewall portion at certain intervals in the tire circumferential direction. The pneumatic tire described in International Patent Publication No. WO 2009/133892 is designed to suppress an increase in the temperature of a sidewall portion and includes a plurality of radial projections radially disposed about the tire rotation axis in the sidewall portion extending in the tire radial direction and outward in the tire lateral direction.

In a configuration in which a sidewall portion is provided with a projection-like longitudinal protrusion portion extending along the surface of the sidewall portion, when the vehicle travels, the pneumatic tire deflects, and stress is likely to be generated in the direction along the longitudinal protrusion portion. Accordingly, when the pneumatic tire is loaded with a heavy load or experiences cyclic loading, stress concentrates at or near the end portions of the longitudinal protrusion portion, causing cracking in the end portions. As stress is likely to be generated in the direction along the longitudinal protrusion portion, in a similar manner, cracks at or near the end portions of the longitudinal protrusion portion are also likely to grow in the direction along the longitudinal protrusion portion.

SUMMARY

The present technology provides a pneumatic tire that can suppress growth of cracks.

A pneumatic tire according to an embodiment of the present technology includes:

a longitudinal protrusion portion provided on at least one of tire side surfaces located on either side in a tire lateral direction, the longitudinal protrusion portion projecting from the at least one of tire side surfaces and extending along the at least one of tire side surfaces; and serration provided on the at least one of tire side surfaces in a region including an end portion of the longitudinal protrusion portion, the serration being formed of a plurality of small grooves arranged in parallel, and the plurality of small grooves being inclined with respect to a lateral centerline that passes through a center of the longitudinal protrusion portion in a width direction.

The pneumatic tire described above preferably has a configuration wherein the serration includes a plurality of regions where the plurality of small grooves have mutually different angles.

The pneumatic tire described above preferably has a configuration wherein the lateral centerline of the longitudinal protrusion portion intersects a tire circumferential direction line and a tire radial direction line.

The pneumatic tire described above preferably has a configuration wherein the lateral centerline of the longitudinal protrusion portion is formed in an arc shape.

The pneumatic tire described above preferably has a configuration wherein the longitudinal protrusion portion includes two types of the longitudinal protrusion portions having different angles with respect to a tire circumferential direction or a tire radial direction and alternately disposed in the tire circumferential direction.

The pneumatic tire described above preferably has a configuration wherein a portion of the longitudinal protrusion portion that projects furthest outward in the tire lateral direction is located outward of a tire maximum width position in the tire radial direction, and inward of the tire maximum width position in the tire lateral direction in a case that the pneumatic tire is mounted on a regular rim, inflated to a regular internal pressure, and in an unloaded state; and further includes a plurality of recessed portions provided in the at least one of tire side surfaces at a position inward of the tire maximum width position in the tire radial direction.

The pneumatic tire described above preferably has a configuration wherein a portion of the longitudinal protrusion portion that projects furthest outward in the tire lateral direction is located inward of a tire maximum width position in the tire radial direction, and inward of the tire maximum width position in the tire lateral direction in a case that the pneumatic tire is mounted on a regular rim, inflated to a regular internal pressure, and in an unloaded state; and further includes a plurality of recessed portions provided on the at least one of tire side surfaces at a position outward of the tire maximum width position in the tire radial direction.

The pneumatic tire described above preferably has a configuration wherein the longitudinal protrusion portion has a cross-sectional shape of a triangle as viewed in an extension direction of the longitudinal protrusion portion, and a length of a bottom side corresponding to a side of the triangle proximal to the at least one of tire side surfaces has a maximum length at a central portion of the longitudinal protrusion portion in the extension direction and has a minimum length at the end portion of the longitudinal protrusion portion.

The pneumatic tire described above preferably has a configuration wherein a vehicle inner/outer orientation in a case that the pneumatic tire is mounted on a vehicle is designated; and the longitudinal protrusion portion is at least provided on the at least one of tire side surfaces on a vehicle outer side.

A pneumatic tire according to an embodiment of the present technology can provide the effect of suppressing crack growth.

BRIEF DESCRIPTION OF DRAWINGS

FIG. 20A is a table showing the results of performance tests of pneumatic tires according to embodiments.

FIG. 20B is a table showing the results of performance tests of pneumatic tires according to embodiments.

DETAILED DESCRIPTION

Pneumatic tires according to embodiments of the present technology are described in detail below with reference to the drawings. However, the technology is not limited to these embodiments. Constituents of the following embodiments include elements that are essentially identical or that can be substituted or easily conceived by one skilled in the art.

Herein, "tire lateral direction" refers to the direction that is parallel with a rotation axis of a pneumatic tire. "Inward in the tire lateral direction" refers to the direction toward the tire equatorial plane in the tire lateral direction. "Outward in the tire lateral direction" refers to the direction opposite the direction toward the tire equatorial plane in the tire lateral direction.

Furthermore, "tire radial direction" refers to the direction orthogonal to the tire rotation axis. "Inward in the tire radial direction" refers to the direction toward the tire rotation axis in the tire radial direction. "Outward in the tire radial direction" refers to the direction away from the tire rotation axis in the tire radial direction. "Tire circumferential direction" refers to the direction of rotation about the tire rotation axis.

Figure 1:
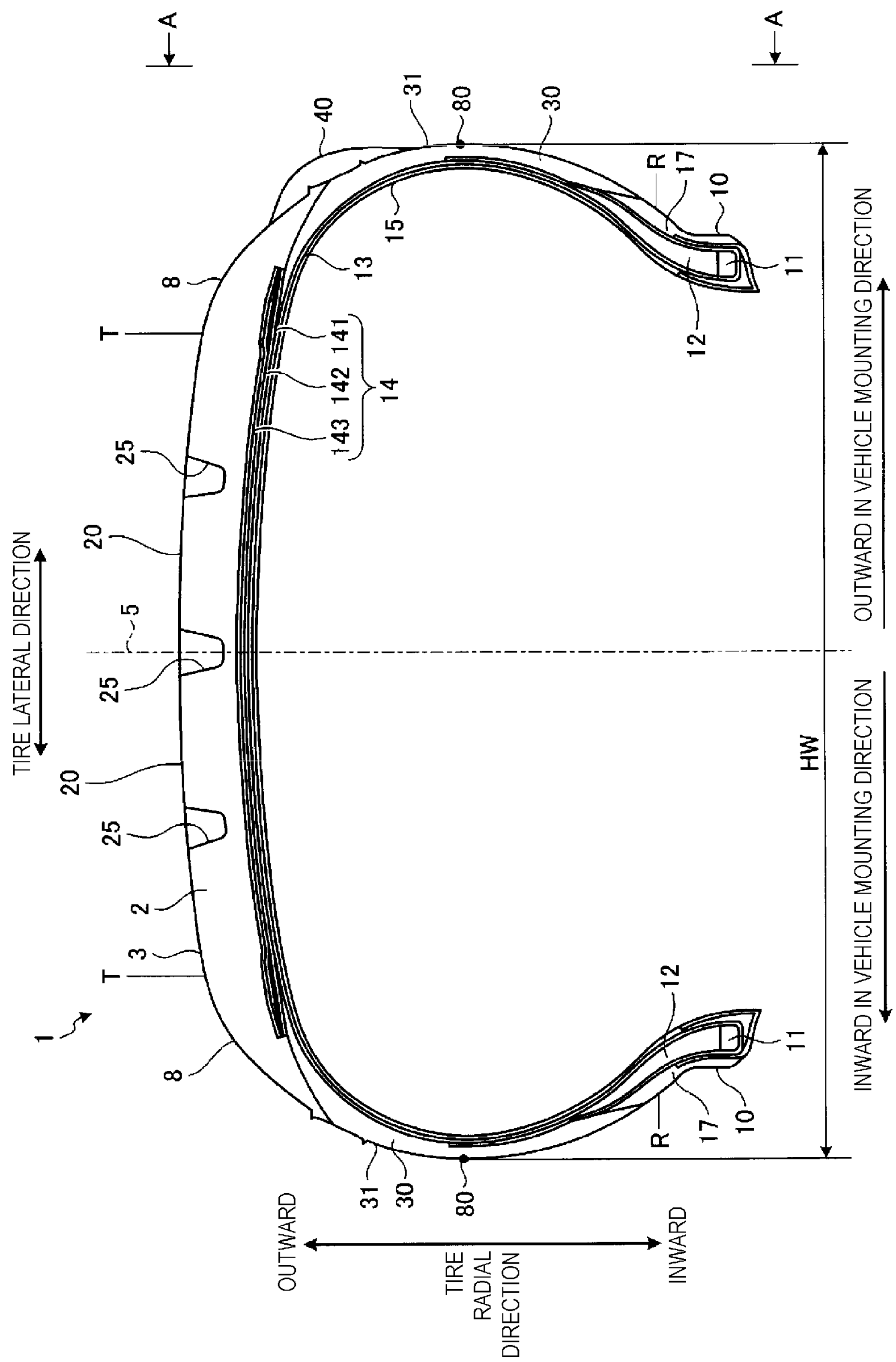
FIG. 1 is a meridian cross-sectional view illustrating a main portion of a pneumatic tire according to an embodiment.

FIG. 1 is a meridian cross-sectional view illustrating a main portion of a pneumatic tire according to an embodiment. For the pneumatic tire 1 illustrated in FIG. 1, a mounting direction with respect to a vehicle, i.e., a vehicle inner/outer side orientation for when mounted, is designated. The pneumatic tire 1 includes a mounting direction indicator portion (not illustrated) that indicates the mounting direction with respect to a vehicle. The mounting direction indicator portion, for example, is constituted by a mark or grooves/ridges on the sidewall portion of the tire. For example, Economic Commission for Europe Regulation 30 (ECE R30) requires that a mounting direction indicator portion is provided on the sidewall portion on the outer side in the vehicle width direction when the tire is mounted on a vehicle. The pneumatic tire 1, as viewed in a meridian cross-section, is provided with a tread portion 2 in the outermost portion in the tire radial direction. The surface of the tread portion 2, i.e., the portion that comes into contact with the road surface when a vehicle (not illustrated) mounted with the pneumatic tire 1 travels, is formed as a tread surface 3. In the tread surface 3 of the tread portion 2, a plurality of main grooves 25 extending in the tire circumferential direction are formed. In the tread surface 3, a plurality of land portions 20 are defined by the plurality of main grooves 25. Grooves other than the main grooves 25 may be formed in the tread surface 3, and lug grooves (not illustrated) extending in the tire lateral direction, narrow grooves (not illustrated) different from the main grooves 25, and the like may be formed.

Shoulder portions 8 are located at either end of the tread portion 2 in the tire lateral direction. Sidewall portions 30 are disposed inward of the shoulder portions 8 in the tire radial direction. In other words, the sidewall portions 30 are disposed at two positions on either side of the pneumatic tire 1 in the tire lateral direction. The surfaces of the sidewall portions 30 are formed as tire side surfaces 31. The tire side surfaces 31 are located on either side in the tire lateral direction. The tire side surfaces 31 at two positions face the side opposite from where a tire equatorial plane 5 is located in the tire lateral direction.

"Tire side surface 31" in this configuration refers to the surface that uniformly continues from a ground contact edge T of the tread portion 2 outward in the tire lateral direction, or, in other words, in a range from a rim check line R outward in the tire radial direction. "Ground contact edge T" refers to both outermost edges in the tire lateral direction of a region in which the tread surface 3 of the tread portion 2 of the pneumatic tire 1 contacts the road surface when the pneumatic tire 1 is mounted on a regular rim, inflated to the regular internal pressure, and loaded with 70% of the regular load. The ground contact edges T are continuous in the tire circumferential direction. Moreover, "rim check line R" refers to a line used to confirm whether the tire has been mounted on the rim correctly and, typically, is an annular convex line located outward of a rim flange (not illustrated) in the tire radial direction and continues in the tire circumferential direction along a portion adjacent to the rim flange on a front side surface of bead portions 10.

Herein, "regular rim" refers to an "applicable rim" defined by the Japan Automobile Tyre Manufacturers Association Inc. (JATMA), a "Design Rim" defined by the Tire and Rim Association, Inc. (TRA), or a "Measuring Rim" defined by the European Tyre and Rim Technical Organisation (ETRTO). Additionally, "regular internal pressure" refers to a "maximum air pressure" defined by JATMA, to the maximum value in "TIRE LOAD LIMITS AT VARIOUS COLD INFLATION PRESSURES" defined by TRA, and to "INFLATION PRESSURES" defined by ETRTO. Additionally, "regular load" refers to a "maximum load capacity" defined by JATMA, the maximum value in "TIRE LOAD LIMITS AT VARIOUS COLD INFLATION PRESSURES" defined by TRA, and a "LOAD CAPACITY" defined by ETRTO.

The bead portions 10 are located inward in the tire radial direction of each sidewall portion 30 located on either side in the tire lateral direction. The bead portions 10 are disposed at two positions on either side of the tire equatorial plane 5 in a similar manner to that of the sidewall portions 30. The bead portions 10 are each provided with a bead core 11, and a bead filler 12 is provided outward of the bead core 11 in the tire radial direction.

A plurality of belt layers 14 is provided inward of the tread portion 2 in the tire radial direction. The belt layers 14 include a plurality of cross belts 141, 142 and a belt cover 143 and form a multilayer structure. The cross belts 141, 142 are made by a process of covering a plurality of belt cords made of steel or an organic fiber material with a coating rubber and then a rolling process. The cross belts 141, 142 have a belt angle, as an absolute value, ranging from 20° to 55°. Furthermore, the belt cords of the cross belts 141, 142 differ in that the set inclination angle of the fiber direction of the belt cords with respect to the tire circumferential direction differs, and the belts are layered so that the fiber directions of the belt cords intersect each other, i.e., a crossply structure. The belt cover 143 is constituted by a plurality of cords formed from steel or an organic fiber material covered by coating rubber and subjected to a rolling process. The belt cover 143 has a belt angle, as an absolute value, ranging from 0° to 10°. The belt cover 143 is disposed in a layered manner outward of the cross belts 141, 142 in the tire radial direction.

A carcass layer 13 is continuously provided inward of the belt layers 14 in the tire radial direction and on the side of the sidewall portions 30 proximal to the tire equatorial plane 5. The carcass layer 13 is a radial ply including textile cords. The carcass layer 13 has a single layer structure made of one carcass ply or a multilayer structure made of a plurality of carcass plies, and extends between the bead cores 11 on either side in the tire lateral direction in a toroidal shape, forming the framework of the tire. Specifically, the carcass layer 13 is disposed from one bead portion 10 to the other bead portion 10 located on either side in the tire lateral direction, and turns back outward in the tire lateral direction along the bead portions 10 and the bead cores 11, wrapping around the bead cores 11 and the bead fillers 12. The carcass ply (plies) of the carcass layer 13 is made by a process of covering a plurality of carcass cords made of steel or an organic fiber material, such as aramid, nylon, polyester, rayon, and the like, with a coating rubber and then a rolling process. The carcass ply (plies) has a carcass angle, i.e., an inclination angle of the fiber direction of the carcass cords with respect to the tire circumferential direction, as an absolute value, ranging from 80° to 95°.

A rim cushion rubber 17 is disposed radially inward and laterally outward of the bead core 11 and turned back portion of the carcass layer 13 at the bead portion 10. The rim cushion rubber 17 is the contact surface of the bead portion 10 against the rim flange. Additionally, an innerliner 15 is formed along the carcass layer 13 on the inner side of the carcass layer 13 or on the interior side of the pneumatic tire 1 of the carcass layer 13.

Figure 2:
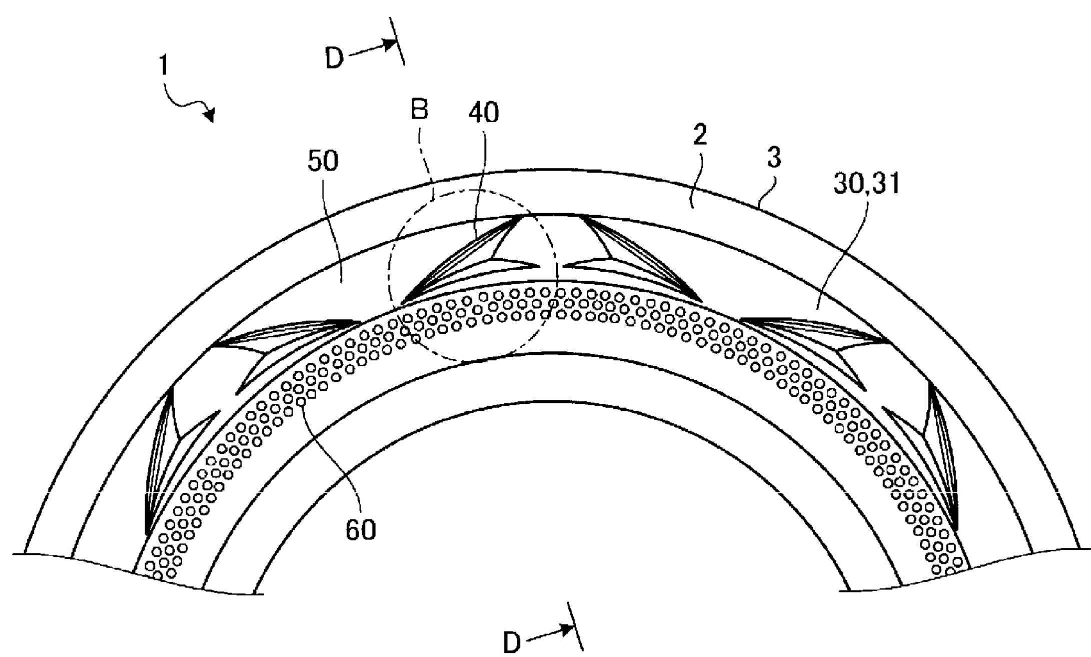
FIG. 2 is a view taken along line A-A of FIG. 1 in the direction of the arrows.

FIG. 2 is a view taken along line A-A in FIG. 1. Of the tire side surfaces 31 located on either side in the tire lateral direction, the tire side surface 31 located on the outer side in the vehicle width direction when the tire is mounted on a vehicle, i.e., the tire side surface 31 on the vehicle outer side, is provided with a plurality of longitudinal protrusion portions 40. The longitudinal protrusion portions 40 project from the tire side surface 31 and extend along the tire side surface 31.

Figure 3:
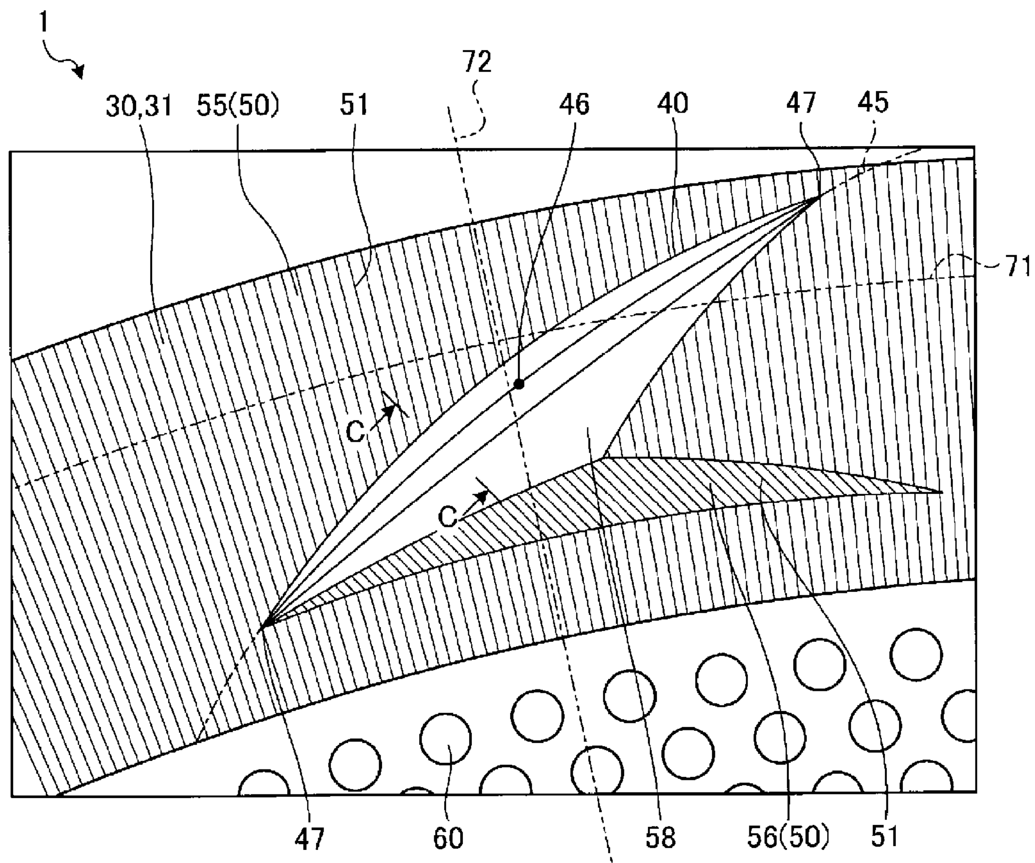
FIG. 3 is a detailed view of area B of FIG. 2.

FIG. 3 is a detailed view of area B of FIG. 2. As illustrated in FIG. 3, the longitudinal protrusion portions 40 has the greatest width in the central region in the length direction, and the width decreases towards both ends in the length direction in a plan view of the longitudinal protrusion portion 40. Additionally, the longitudinal protrusion portions 40 are inclined with respect to both the tire circumferential direction and the tire radial direction. In other words, the longitudinal protrusion portion 40 is formed such that lateral centerline 45 of the longitudinal protrusion portion 40 passing through the center in the width direction of the longitudinal protrusion portion 40 intersects a tire circumferential direction line 71 indicating the tire circumferential direction of the pneumatic tire 1 and a tire radial direction line 72 indicating the tire radial direction of the pneumatic tire 1. Furthermore, the longitudinal protrusion portion 40 is formed in an arc shape in a plan view, i.e., the lateral centerline 45 is formed in an arc shape. Specifically, the longitudinal protrusion portion 40 is formed in an arc shape with the projecting side of the arc extending outward in the tire radial direction while extending in a discretionary direction in the tire circumferential direction.

The longitudinal protrusion portion 40 inclined with respect to the tire circumferential direction and the tire radial direction include two types of longitudinal protrusion portions 40 with different angles with respect to the tire circumferential direction or the tire radial direction. The two types of longitudinal protrusion portions 40 are alternately disposed in the tire circumferential direction. Specifically, the longitudinal protrusion portions 40 are disposed such that adjacent pairs of longitudinal protrusion portions 40 have a line-symmetric shape and position about the tire radial direction line 72 extending in the tire radial direction. In other words, the longitudinal protrusion portions 40 are grouped as adjacent pairs of longitudinal protrusion portions 40, and a plurality of the groups of longitudinal protrusion portions 40 are disposed at equal intervals in the tire circumferential direction.

Figure 4:
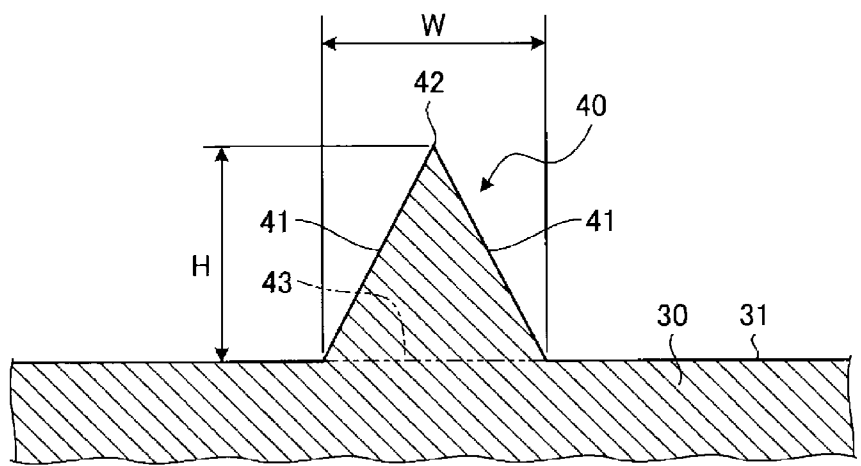
FIG. 4 is a cross-sectional view taken along C-C of FIG. 3.

FIG. 4 is a cross-sectional view taken along C-C of FIG. 3. The longitudinal protrusion portion 40 has a substantially triangular cross-sectional shape as viewed in the extension direction of the longitudinal protrusion portion 40. Specifically, the longitudinal protrusion portion 40 is shaped substantially like an isosceles triangle with a bottom side 43 of the triangle being connected to the tire side surface 31. Accordingly, the lateral centerline 45 corresponds to a line along a corner portion 42 where two inclined sides 41 of the isosceles triangle connect.

Additionally, in the longitudinal protrusion portion 40, the length of the bottom side 43 located proximal to the tire side surface 31 is at a maximum at a central portion 46 (see FIG. 3) of the longitudinal protrusion portion 40 in the extension direction and at a minimum at end portions 47 (see FIG. 3) of the longitudinal protrusion portion 40. As a result, a width W of the longitudinal protrusion portion 40 is the greatest at or near the central portion 46, and the width W decreases toward either end in the length direction, becoming the smallest at the end portions 47. In a similar manner, a height H of the longitudinal protrusion portion 40 from the tire side surface 31 is the greatest at or near the central portion 46, and the height H decreases toward either end in the length direction, becoming the smallest at the end portions 47 (see FIG. 9).

Note that in the longitudinal protrusion portion 40, the maximum width Wmax, i.e., the width W of the portion with the greatest width W, is from 1.0 mm to 10.0 mm, and the maximum height Hmax, i.e., the height H of the portion with the greatest height H, is from 1.0 mm to 10.0 mm.

Additionally, serration 50 is formed in the region of the tire side surface 31 where the longitudinal protrusion portions 40 are provided (see FIG. 3). The serration 50 is formed from a plurality of small grooves 51 arranged in parallel, and is provided on the tire side surface 31 around the longitudinal protrusion portion 40 at least in a region including the end portions 47 of the longitudinal protrusion portion 40. The small grooves 51 of the serration 50 are inclined with respect to the lateral centerline 45 of the longitudinal protrusion portion 40. In other words, the small grooves 51 of the serration 50 are non-parallel with the lateral centerline 45.

Note that the small grooves 51 that form the serration 50 are grooves with a depth ranging from 0.1 mm to 0.8 mm, and a groove width ranging from 0.1 mm to 0.8 mm. The interval between small grooves 51 is from 0.3 mm to 1.0 mm.

Figure 5:
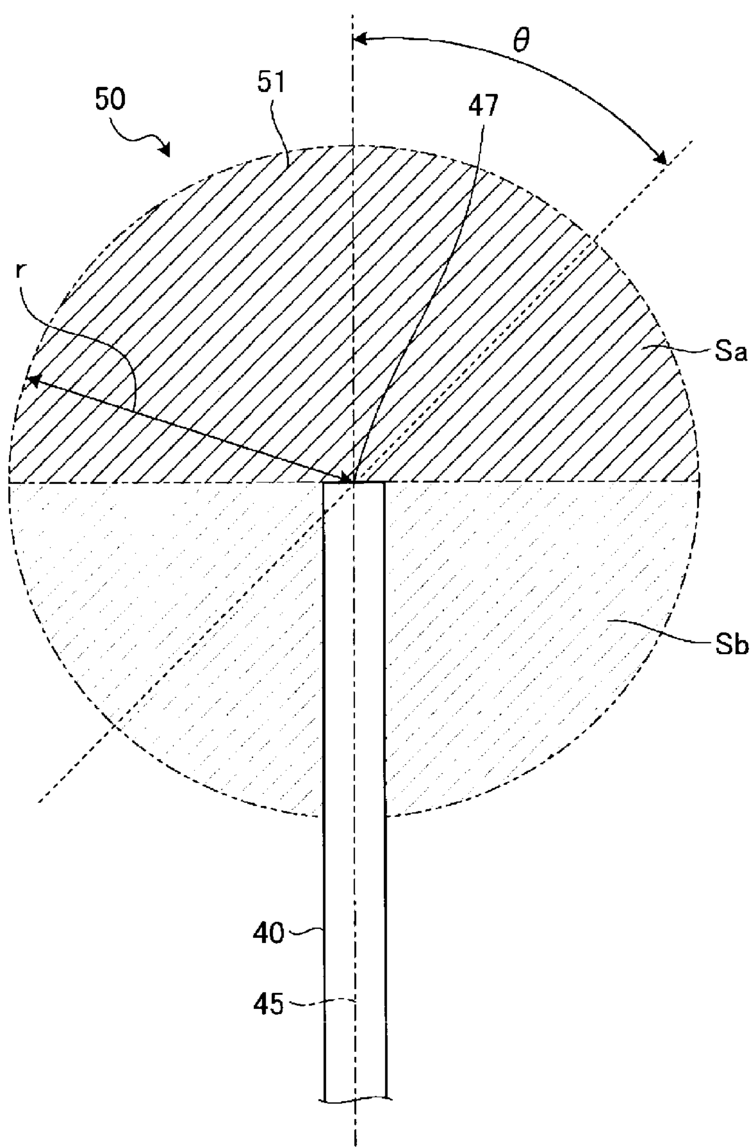
FIG. 5 is a schematic diagram for describing a region where serration is provided and the angle of small grooves.

FIG. 5 is a schematic diagram for describing the region where the serration is provided and the angle of the small grooves. A circle with the end portion 47 of the longitudinal protrusion portion 40 as the center and a radius r of 5 mm or greater includes a semicircle Sa and a semicircle Sb where the longitudinal protrusion portion 40 is located. The region of the tire side surface 31 where the serration 50 is provided at least includes the region within a semicircle Sa.

Figure 6:
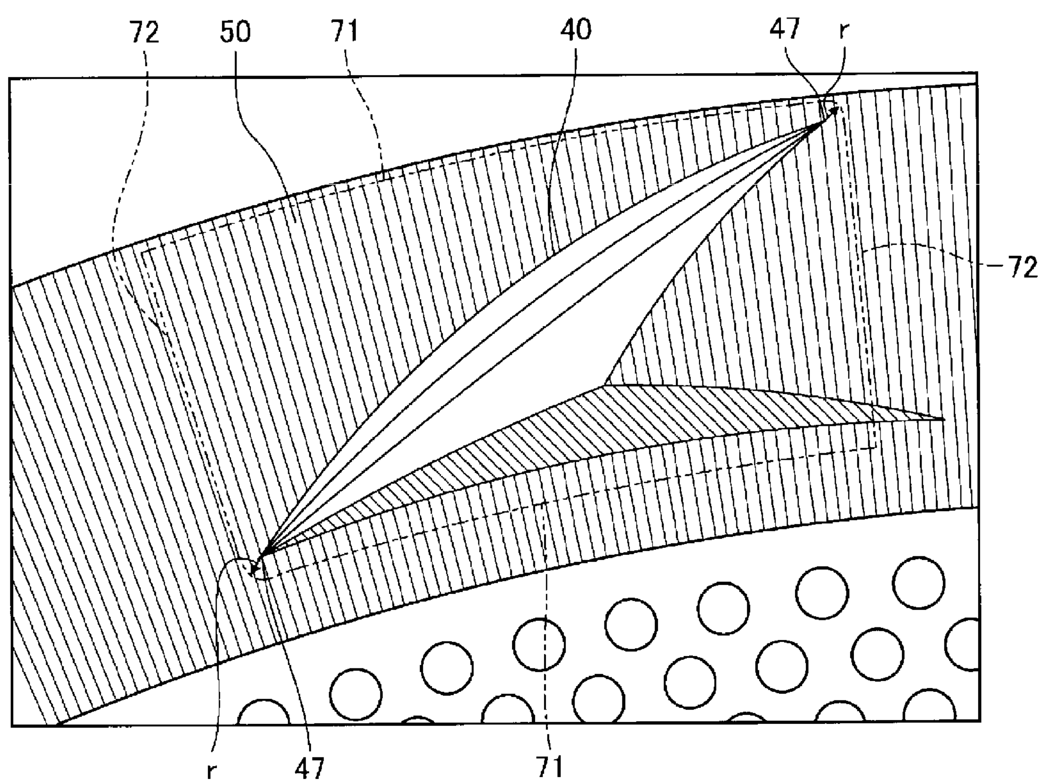
FIG. 6 is an explanatory diagram of a region where serration is provided.

FIG. 6 is an explanatory diagram of a region where the serration is provided. The serration 50 formed in the region where the longitudinal protrusions portion 40 are provided is preferably at least provided within the region defined by the tire circumferential direction lines 71 and the tire radial direction lines 72 that come into contact with the arcs with the two end portions 47 of the longitudinal protrusion portion 40 as the center and the radius r of 5 mm or greater. In other words, opposite angles are formed in the vicinity of the two end portions 47 of the longitudinal protrusion portion 40, and the serration 50 is preferably at least formed within the substantially rectangular region defined by two of the tire circumferential direction lines 71 and two of the tire radial direction lines 72 that compose the opposite angles.

A condition that the lateral centerline 45 of the longitudinal protrusion portion 40 and the small grooves 51 of the serration 50 are non-parallel will be described. In an embodiment in which the lateral centerline 45 of the longitudinal protrusion portion 40 and the small grooves 51 of the serration 50 are linear, the lateral centerline 45 and the small grooves 51 are formed with points of intersection. In this embodiment, the angle θ formed by the lateral centerline 45 and the small grooves 51 ranges from 5° to 175°.

Figure 7:
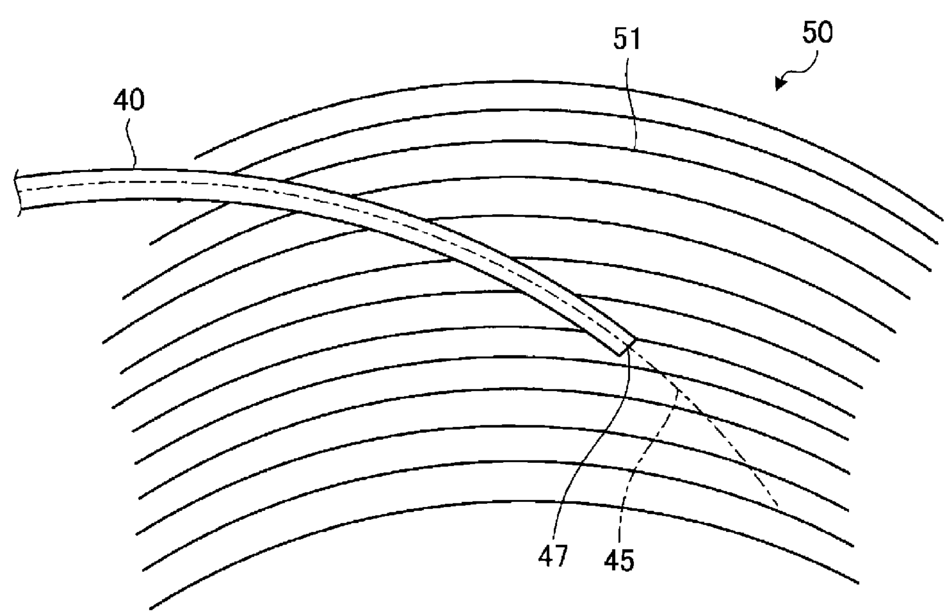
FIG. 7 is a schematic diagram for describing a condition that the small grooves of the serration and a longitudinal protrusion portion are non-parallel in an embodiment in which the small grooves of the serration and the longitudinal protrusion portion are curved lines.

FIG. 7 is a schematic diagram for describing a condition that the small grooves of the serration and the longitudinal protrusion portion are non-parallel in an embodiment in which the small grooves of the serration and the longitudinal protrusion portion are curved lines. In an embodiment in which the longitudinal protrusion portion 40 and the small grooves 51 of the serration 50 are shaped like curved lines, the curvature of the lateral centerline 45 of the longitudinal protrusion portion 40 and the curvature of the small grooves 51 of the serration 50 are mutually different. In this embodiment, the difference in the two radii of curvature is 5 mm or greater.

Additionally, the center position of the arc of the lateral centerline 45 and the center position of the arc of the small grooves 51 have different positions. In an embodiment in which the longitudinal protrusion portion 40 and the small grooves 51 of the serration 50 are shaped like curved lines, this configuration allows the lateral centerline 45 and the small grooves 51 to be non-parallel.

In the pneumatic tire 1 according to the present embodiment, the lateral centerline 45 of the longitudinal protrusion portion 40 is formed in an arc shape, and conversely the small grooves 51 of the serration 50 are linear. Thus, the lateral centerline 45 and the small grooves 51 are non-parallel.

Additionally, the serration 50 includes a plurality of regions where the small grooves 51 have mutually different angles. Specifically, the serration 50 includes a first serration portion 55 (see FIG. 3) and a second serration portion 56 (see FIG. 3) where the small grooves 51 have mutually different angles. The first serration portion 55 and the second serration portion 56 include small grooves 51 with relatively different angles and are both inclined with respect to the lateral centerline 45 of the longitudinal protrusion portion 40.

Figure 8:
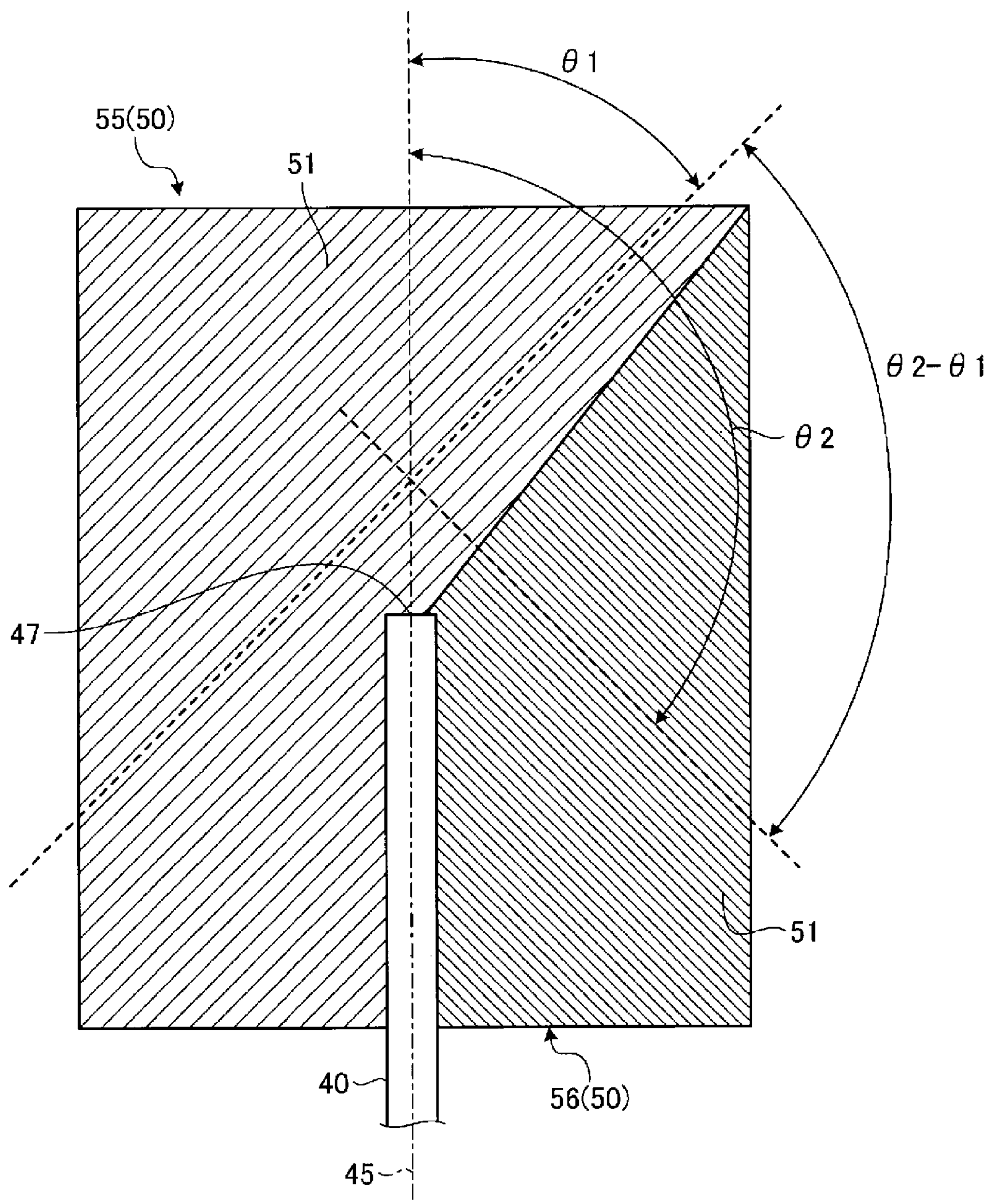
FIG. 8 is a schematic diagram for describing the angles of the small grooves of a first serration portion and a second serration portion.

FIG. 8 is a schematic diagram for describing the angles of the small grooves of the first serration portion and the second serration portion. θ1 and θ2 of the first serration portion 55 and the second serration portion 56 are both from 5° to 175°, where θ1 is the angle formed by the lateral centerline 45 of the longitudinal protrusion portion 40 and the small grooves 51 of the first serration portion 55, and θ2 is the angle formed by the lateral centerline 45 and the small grooves 51 of the second serration portion 56. Additionally, the angle difference θ2-θ1 of the angle θ1 of the small grooves 51 of the first serration portion 55 and the lateral centerline 45 and the angle θ2 of the small grooves 51 of the second serration portion 56 and the lateral centerline 45 is from 5° to 175°. In other words, the angles θ1, θ2 of the small grooves 51 with respect to the lateral centerline 45 in the first serration portion 55 and the second serration portion 56 have an angle difference as an absolute value |θ1-θ2| ranging from 5° to 175°. Note that the small grooves 51 of first serration portion 55 and the second serration portion 56 may also have relatively different intervals, and not only relatively different angles.

In the pneumatic tire 1 according to the present embodiment, of the first serration portion 55 and the second serration portion 56 formed as described above, in the first serration portion 55, the small grooves 51 are formed in a direction generally conforming to the tire radial direction (see FIG. 3). Additionally, the small grooves 51 of the second serration portion 56 are inclined with respect to the tire radial direction. Specifically, the small grooves 51 are inclined with respect to the tire radial direction in the direction opposite to the direction in which the longitudinal protrusion portion 40 is inclined with respect to the tire radial direction. As a result, the first serration portion 55 and the second serration portion 56 have small grooves 51 that are relatively inclined with respect to each other and are inclined with respect to the lateral centerline 45 of the longitudinal protrusion portion 40.

Additionally, the pneumatic tire 1 according to the present embodiment includes a no-serration region 58 in the vicinity of the longitudinal protrusion portion 40 on the tire side surface 31. The no-serration region 58 is a region where the serration 50 is not formed (see FIG. 3). Specifically, the no-serration region 58 is formed inward of the arc of the longitudinal protrusion portion 40 formed in an arc shape, is located in an inner portion of the arc of the longitudinal protrusion portion 40, and is located along the longitudinal protrusion portion 40 between the end portions 47 of the longitudinal protrusion portion 40. Specifically, the no-serration region 58 has a substantially triangular shape. One side of the substantially triangular shape of the no-serration region 58 borders the longitudinal protrusion portion 40. In other words, the inner portion of the arc of the longitudinal protrusion portion 40 borders the no-serration region 58.

The first serration portion 55 borders the outer portion of the arc of the longitudinal protrusion portion 40 and is formed around the longitudinal protrusion portion 40, as well as being formed on the side where the no-serration region 58 is located. The portion of the first serration portion 55 formed on the side where the no-serration region 58 is located borders the no-serration region 58 on the side opposite the side that borders the longitudinal protrusion portion 40. The first serration portion 55 formed in this manner includes a region of the circle with the end portion 47 of the longitudinal protrusion portion 40 as the center and a radius r of 5 mm or greater described using FIG. 5 within the semicircle Sa excluding the semicircle Sb where the longitudinal protrusion portion 40 is located.

Additionally, the second serration portion 56 is formed on the same side as the side where the no-serration region 58 is located with respect to the longitudinal protrusion portion 40, and borders the no-serration region 58 at a side different from the side of the no-serration region 58 bordering the longitudinal protrusion portion 40 and the side bordering the first serration portion 55.

Furthermore, the second serration portion 56 extends in the same direction as the longitudinal protrusion portion 40 extending in the tire circumferential direction from at or near the end portion 47, of both the end portions 47 of the longitudinal protrusion portion 40, proximal to the side of the no-serration region 58 that borders the second serration portion 56. The second serration portion 56 has approximately the same length as that of the longitudinal protrusion portion 40, and similar to the longitudinal protrusion portion 40, the width is the greatest in the central region in the length and decreases toward both ends. In other words, the second serration portion 56 has a shape similar to that of the longitudinal protrusion portion 40, and is formed in the shape of the longitudinal protrusion portion 40 having been rotated about one of the end portions 47 inward in the tire radial direction.

Note that the portion of the serration 50 bordering the longitudinal protrusion portion 40 may not exactly be in contact with the longitudinal protrusion portion 40 and a gap against the longitudinal protrusion portion 40 may be formed.

Additionally, a plurality of recessed portions 60 are formed in the region of the tire side surface 31 located inward of the region where the serration 50 is formed in the tire radial direction (see FIG. 3). In other words, the serration 50 is formed in the region outward of a predetermined position in the tire radial direction, and the recessed portions 60 are formed in the region inward of a predetermined position in the tire radial direction. The recessed portions 60 each have a substantially circular shape of approximately the same size in a plan view of the recessed portion 60 and are recessed from the tire side surface 31.

Figure 9:
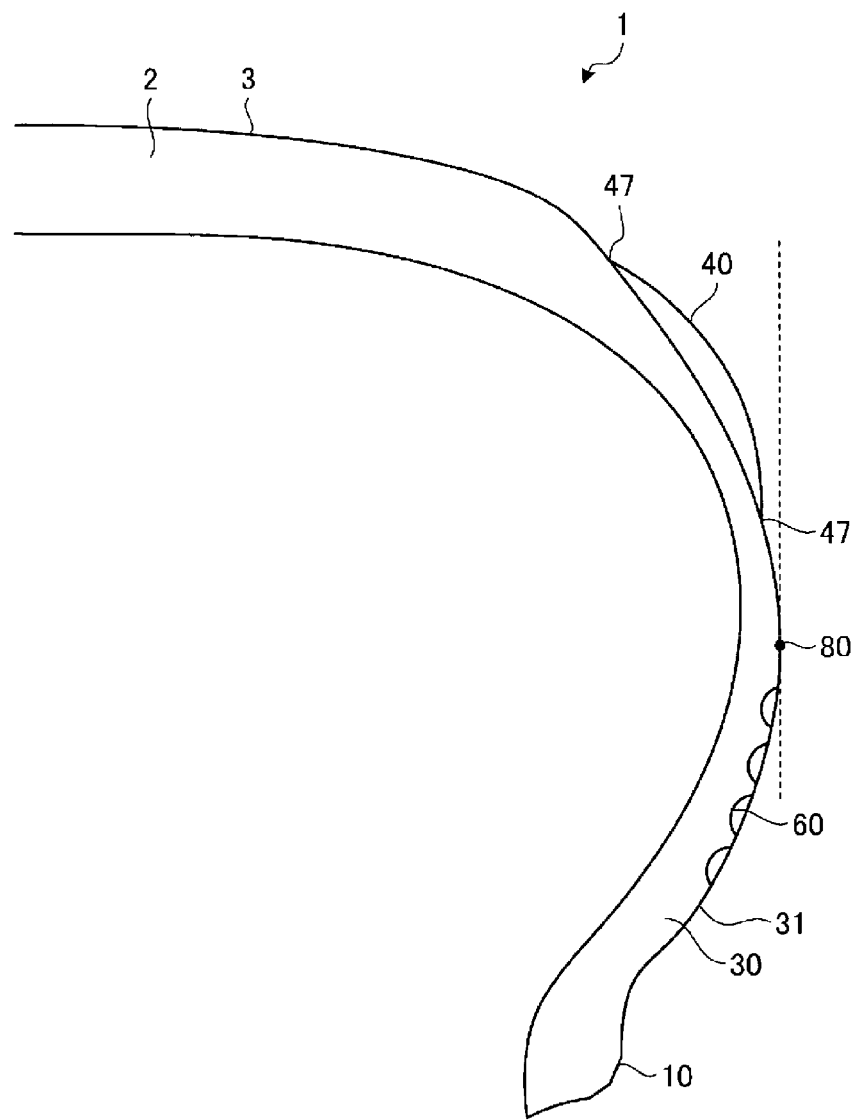
FIG. 9 is a cross-sectional view taken along D-D of FIG. 2.

FIG. 9 is a cross-sectional view taken along D-D of FIG. 2. The portion of the longitudinal protrusion portion 40 projecting furthest outward in the tire lateral direction is located outward of a tire maximum width position 80 in the tire radial direction. The longitudinal protrusion portions 40 are located inward of the tire maximum width position 80 in the tire lateral direction, when the tire is mounted on a regular rim, inflated to the regular internal pressure, for example, an internal pressure of 230 kPa, and in an unloaded state. The recessed portions 60 are all provided in the tire side surface 31 at positions inward of the tire maximum width position 80 in the tire radial direction.

In this embodiment, "tire maximum width position 80" refers to a position at the ends of the tire cross-sectional width HW (see FIG. 1) where the width in the tire lateral direction is the greatest. "Tire cross-sectional width HW" is the interval between the sidewall portions 30, i.e., the width excluding any patterns and alphanumerics on the tire side surface when the pneumatic tire 1 is mounted on a regular rim, inflated to the regular internal pressure, and in an unloaded state. In tires provided with a rim protection bar (provided in the tire circumferential direction and projecting outward in the tire lateral direction) that protects the rim, the rim protection bar is the outermost portion in the tire lateral direction, but the tire cross-sectional width HW as defined in the present embodiment excludes the rim protection bar.

Figure 10:
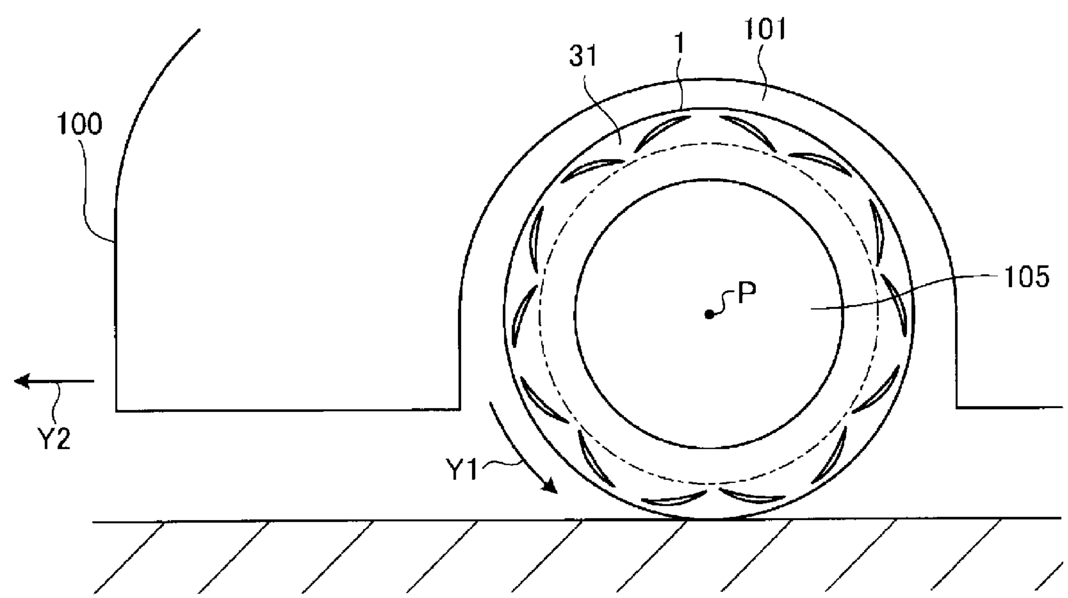
FIG. 10 is an explanatory diagram of when the pneumatic tire illustrated in FIG. 2 is mounted on a vehicle.

FIG. 10 is an explanatory diagram of when the pneumatic tire illustrated in FIG. 2 is mounted on a vehicle. In mounting the pneumatic tire 1 according to the present embodiment on a vehicle 100, the pneumatic tire 1 mounted on a rim 105 is disposed in a tire housing 101. Here, the pneumatic tire 1 is mounted on the vehicle 100 such that the tire side surface 31 on the side where the longitudinal protrusion portions 40 are provided faces outward in the vehicle width direction.

When the vehicle 100 travels, the pneumatic tire 1 rotates about a rotation axis P in the direction Y1 illustrated in FIG. 10, and the vehicle 100 moves in the direction Y2. Here, when the vehicle 100 is traveling, the air flow around the pneumatic tire 1 has low velocity. In response to the slow air flow, an air flow from down to up is created in the tire housing 101. This in turn creates lift, which is a force that raises the vehicle 100 upward. Additionally, in response to the slow air flow, a bulge of air separating from the vehicle 100 is formed outside of the tire housing 101, causing air resistance.

In light of such phenomenon, the pneumatic tire 1 of the present embodiment includes the longitudinal protrusion portions 40 that rotate in the rotation direction Y1 when the vehicle 100 travels. The longitudinal protrusion portions 40 generate a tiny vortex in the air around the pneumatic tire 1 to minimize the slow air flow described above. Specifically, at the lower portion of the pneumatic tire 1 when the pneumatic tire 1 is rotating (lower side of a rotation axis P), the speed of the air flowing past the bottom portion of the vehicle 100 is increased. This reduces the air flow from down to up in the tire housing 101, thus suppressing the air pressure upward. As a result, lift can be suppressed. Suppressing lift (lift reducing performance) results in an increase in downforce, an improvement in contact of the pneumatic tire 1 with the ground, and an improvement in steering stability performance, which is a measure of driving performance of the vehicle 100. Additionally, at the upper portion of the pneumatic tire 1 when the pneumatic tire 1 is rotating (upper side of the rotation axis P), a tiny vortex is generated. This promotes the air flow around the pneumatic tire 1. As a result, the spread of the passing air is suppressed, so the air resistance of the pneumatic tire 1 can be reduced. Reducing the air resistance leads to an improvement in the fuel economy of the vehicle 100.

Additionally, when the vehicle 100 is traveling, the pneumatic tire 1 is constantly rotating while deflecting. Furthermore, the load acting on the pneumatic tire 1 changes moment to moment and how the tire deflects changes due to acceleration/deceleration, cornering, the unevenness of the road surface, and the like. As a result, some portions of the pneumatic tire 1 may experience stress concentration. For example, the portion of the tire side surface 31 where the longitudinal protrusion portions 40 are formed may experience stress concentration. Here, as the stress increases and the deflection repeats, cracking occurs in the portion where the longitudinal protrusion portions 40 are formed. The tire side surface 31 at or near the end portions 47 of the longitudinal protrusion portions 40 is susceptible to cracking, and cracks that form are likely to grow in the extension direction of the longitudinal protrusion portions 40.

The serration 50 is formed in the region of the tire side surface 31 including the end portions 47 of the longitudinal protrusion portions 40. The small grooves 51 of the serration 50 are inclined with respect to the lateral centerline 45 of the longitudinal protrusion portion 40, i.e., inclined with respect to the crack growth direction. Thus, cracks that form at or near the end portions 47 of the longitudinal protrusion portions 40 are stopped by the small grooves 51 of the serration 50 and further growth is prevented. As a result, the growth of cracks can be suppressed.

The serration 50 includes a region of the circle with the end portion 47 of the longitudinal protrusion portion 40 as the center and a radius of 5 mm or greater within the semicircle Sa excluding the semicircle Sb where the longitudinal protrusion portion 40 is located. This allows the growth of cracks to be more reliably suppressed. In other words, in a configuration in which the region provided with the serration 50 has a radius or less than 5 mm with the end portion 47 of the longitudinal protrusion portion 40 as the center, when cracking occurs at or near the end portion 47 of the longitudinal protrusion portion 40, the growth of cracks in the direction of the lateral centerline 45 of the longitudinal protrusion portion 40 is difficult to stop. Accordingly, when the region where the serration 50 is provided is too small, the stress generated by crack growth can not be dispersed. As a result, crack growth is difficult to stop. Alternatively, in the pneumatic tire 1 according to the embodiment described above, the serration 50 is formed in the region having a radius of 5 mm or greater with the end portion 47 of the longitudinal protrusion portion 40 as the center. As a result, even when cracking occurs at or near the end portion 47 of the longitudinal protrusion portion 40, the direction of the stress can be effectively changed by the small grooves 51 inclined with respect to the lateral centerline 45. As a result, the stress generated by crack growth can be dispersed, and the growth of cracks can be suppressed.

Additionally, the serration 50 includes the first serration portion 55 and the second serration portion 56 with small grooves 51 of different angles. As a result, even when cracks grow to the boundary portion between the first serration portion 55 and the second serration portion 56, crack growth can be stopped at the boundary portion. As a result, the growth of cracks can be more reliably suppressed.

The lateral centerline 45 of the longitudinal protrusion portion 40 intersects the tire circumferential direction line 71 and the tire radial direction line 72. As a result, the vicinity of the longitudinal protrusion portion 40 can be ensured sufficient strength for loads generated in the vertical direction and loads generated in the tire circumferential direction. This can prevent cracking.

The longitudinal protrusion portion 40 is formed such that the lateral centerline 45 has an arc shape. As a result, stress generated at or near the longitudinal protrusion portion 40 can be dispersed. In other words, in a configuration in which the longitudinal protrusion portion 40 is linear, large stress is generated in a linear manner and cracking is likely to occur. However, by the longitudinal protrusion portion 40 being formed in an arc shape, stress generated in a linear manner can be suppressed and stress can be dispersed. This can more reliably prevent cracking.

Additionally, the two types of longitudinal protrusion portions 40 with different angles with respect to the tire circumferential direction or the tire radial direction are alternately disposed in the tire circumferential direction. As a result, the air resistance can be reduced irrespective of the rotation direction of the pneumatic tire 1.

The longitudinal protrusion portions 40 are located inward of the tire maximum width position 80 in the tire lateral direction. As a result, the air flow that collides with the longitudinal protrusion portion 40 can be reduced, and the stress generated at or near the longitudinal protrusion portion 40 can be reduced. This can more reliably prevent cracking. The plurality of recessed portions 60 are provided in the tire side surface 31 at positions inward of the tire maximum width position 80 in the tire radial direction. As a result, not only the longitudinal protrusion portions 40 but also the recessed portions 60 can generate tiny vortices. Thus, air resistance can be more reliably reduced.

By the recessed portions 60 being provided, the increase in weight caused by providing the longitudinal protrusion portions 40 can be offset by the recessed portions 60. As a result, an increase in the overall weight of the pneumatic tire 1 can be suppressed, and fuel economy performance and ride comfort performance can be ensured.

The longitudinal protrusion portion 40 has the maximum width Wmax ranging from 1.0 mm to 10.0 mm. As a result, the strength of the longitudinal protrusion portions 40 can be ensured, and an increase in air resistance and/or weight can be suppressed. In other words, in a configuration in which the maximum width Wmax of the longitudinal protrusion portion 40 is less than 1.0 mm, the longitudinal protrusion portions 40 can not be given sufficient strength. As a result, the longitudinal protrusion portions 40 may fall off the pneumatic tire 1. Additionally, when the maximum width Wmax of the longitudinal protrusion portion 40 is greater than 10.0 mm, an increase in the air resistance may be caused or an increase in the weight of the pneumatic tire 1 may be caused by the longitudinal protrusion portion 40. Alternatively, by the maximum width Wmax of the longitudinal protrusion portion 40 being in the range 1.0 mm to 10.0 mm, an increase in air resistance and/or weight can be suppressed, and the strength of the longitudinal protrusion portions 40 can be ensured.

Additionally, by the pneumatic tire 1 being mounted on the vehicle 100 such that the tire side surface 31 where the longitudinal protrusion portions 40 are provided is disposed on the vehicle outer side, air resistance can be reduced. However, rubber degradation due to exposure to sunlight, contact between obstacles and the longitudinal protrusion portion 40, and the like make the tire side surface 31 located on the vehicle outer side susceptible to cracking at or near the longitudinal protrusion portions 40. Accordingly, even when providing the longitudinal protrusion portions 40 on the tire side surface 31 on the vehicle outer side to reduce air resistance, by providing the serration 50 in the region including the end portions 47 of the longitudinal protrusion portions 40, crack growth can be suppressed. As a result, the effect of the longitudinal protrusion portions 40 reducing air resistance can be obtained for an extended period of time.

Additionally, the serration 50 is formed in the region of the tire side surface 31 including the end portions 47 of the longitudinal protrusion portions 40. As a result, the serration 50 can make the longitudinal protrusion portions 40 stand out, and the visibility of the longitudinal protrusion portions 40 can be improved. In this way, even when the longitudinal protrusion portions 40 are provided on the tire side surface 31 to improve the design and/or recognizability of the pneumatic tire 1, by the serration 50 making the longitudinal protrusion portions 40 stand out, the design and/or recognizability can be improved.

Additionally, in an embodiment in which the longitudinal protrusion portions 40 are provided on one of the tire side surfaces 31 in the tire lateral direction, by improving the visibility of the longitudinal protrusion portions 40, the surface on the side where the longitudinal protrusion portions 40 are provided can be more easily identified. In this way, for example, when the pneumatic tire 1 is mounted on the vehicle 100 such that the tire side surface 31 on the side where the longitudinal protrusion portions 40 are provided is on the vehicle outer side, by making the longitudinal protrusion portions 40 stand out, the orientation of the pneumatic tire 1 can be made easily identifiable. As a result, the pneumatic tire 1 can be easily mounted on the vehicle 100 with the appropriate orientation.

By the longitudinal protrusion portions 40 being made to stand out, a worker working with the pneumatic tire 1 can carefully handle the pneumatic tire 1 such that the longitudinal protrusion portions 40 are not damaged when the pneumatic tire 1 is handled. As a result, damage not only the longitudinal protrusion portions 40 but to the entire pneumatic tire 1 can be prevented.

Additionally, the serration 50 includes a plurality of regions where the small grooves 51 have mutually different angles. As a result, the visibility of the longitudinal protrusion portions 40 can be more reliably improved. In other words, by the serration 50 including a plurality of regions where the small grooves 51 have different angles such as the first serration portion 55 and the second serration portion 56, the lightness/darkness in the serration 50 changes depending on the view direction and/or angle of incident light, and the way the serration 50 is seen changed. In contrast, the longitudinal protrusion portions 40 are typically solid objects, and thus do not produce the same changes in lightness/darkness as the serration 50. In this way, the longitudinal protrusion portions 40 with the serration 50 formed therearound stands out in contrast to the serration 50, and visibility is improved. As a result, design, identifying the orientation of the pneumatic tire 1, and the like can be improved, and the care with which the pneumatic tire 1 is handled can be improved.

Furthermore, by providing the no-serration region 58 in the region where the serration 50 is provided, the visibility of the longitudinal protrusion portions 40 due to these visual effects can be further improved. As a result, the design and the like can be more reliably improved.

Figure 11:
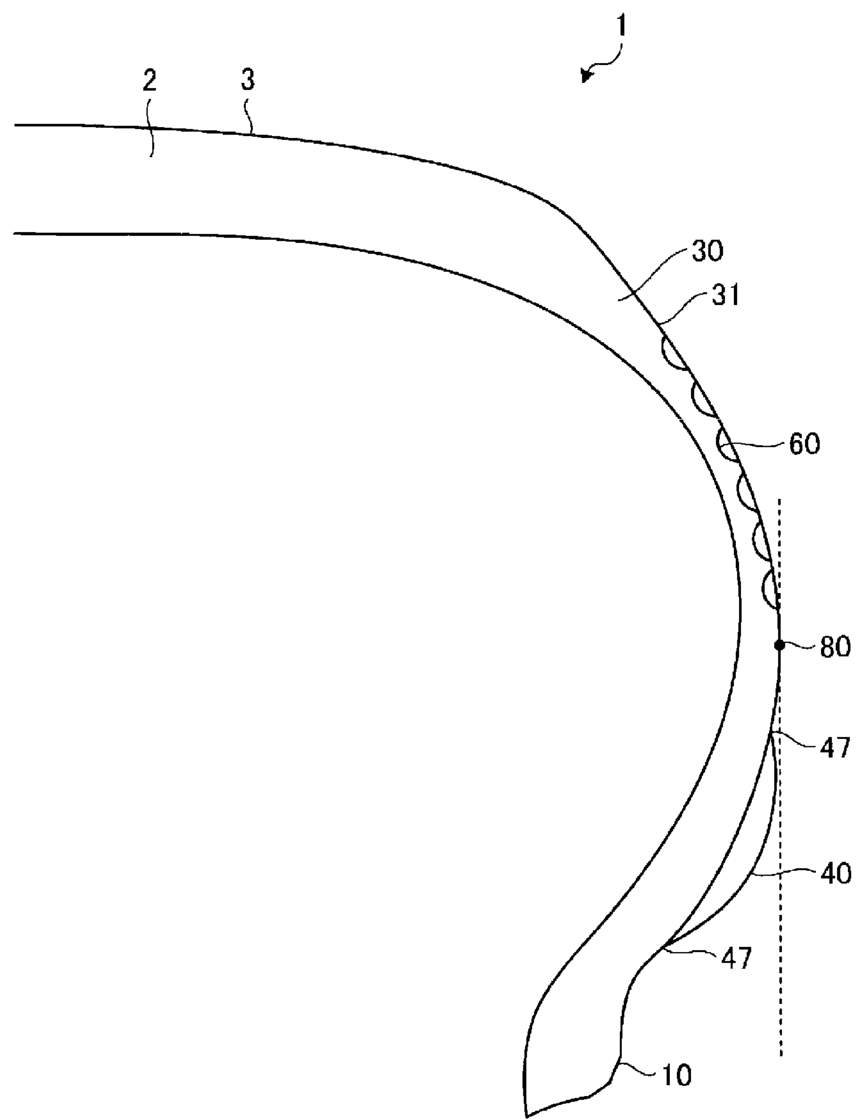
FIG. 11 is an explanatory diagram of a modified example of a pneumatic tire according to an embodiment with the longitudinal protrusion portion located inward of a tire maximum width position in the tire radial direction.

Note that in the pneumatic tire 1 according to the embodiment described above, the longitudinal protrusion portion 40 projects furthest outward in the tire lateral direction at a portion located outward of a tire maximum width position 80 in the tire radial direction. However, the longitudinal protrusion portion 40 may be disposed in another configuration. FIG. 11 is an explanatory diagram of a modified example of a pneumatic tire according to an embodiment with the longitudinal protrusion portion located inward of the tire maximum width position in the tire radial direction. The portion of the longitudinal protrusion portion 40 projecting furthest outward in the tire lateral direction may be located inward of a tire maximum width position 80 in the tire radial direction. In such an embodiment, the longitudinal protrusion portions 40 are located inward of the tire maximum width position 80 in the tire lateral direction, when the tire is mounted on a regular rim, inflated to the regular internal pressure, and in an unloaded state. Additionally, when the longitudinal protrusion portions 40 are disposed as such, the serration 50 is provided at a position inward of the tire maximum width position 80 in the tire radial direction, and the recessed portions 60 are all provided in the tire side surface 31 at positions outward of the tire maximum width position 80 in the tire radial direction. In this way, by providing the longitudinal protrusion portions 40 at a position inward of the tire maximum width position 80 in the tire radial direction, the longitudinal protrusion portions 40 can be located away from the road surface. As a result, the longitudinal protrusion portions 40 are less likely to come into contact with the curb and the like. This can more reliably suppress cracking.

Figure 12:
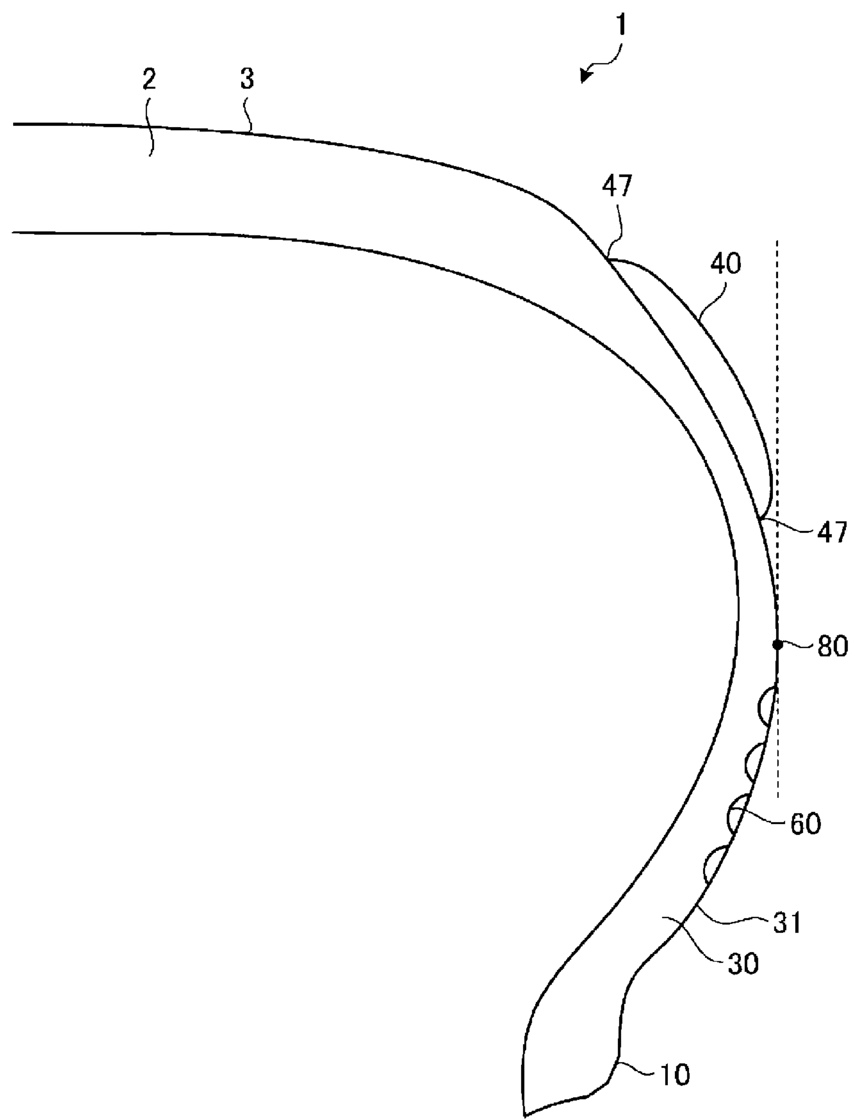
FIG. 12 is an explanatory diagram of a modified example of a pneumatic tire according to an embodiment with the longitudinal protrusion portion formed in a shape in which the height sharply decreases at or near the end portions.
Figure 13:
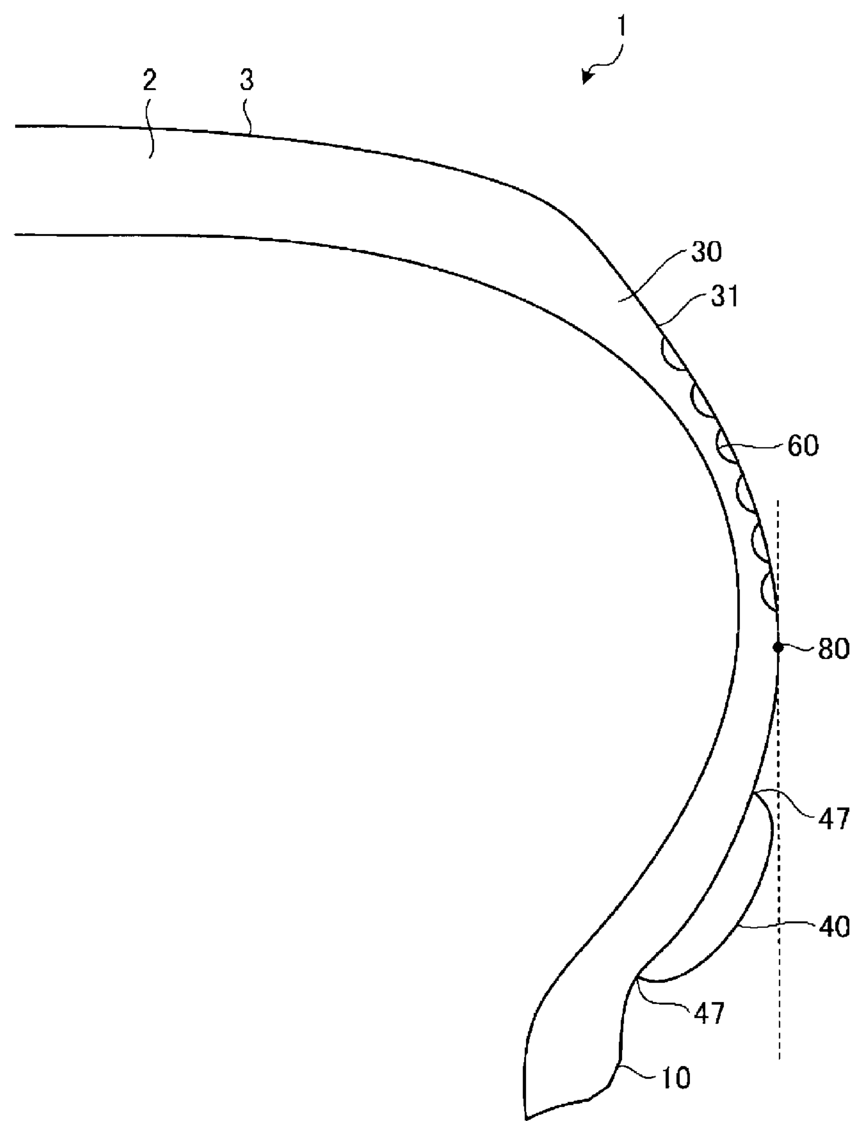
FIG. 13 is an explanatory diagram of a modified example of a pneumatic tire according to an embodiment with the longitudinal protrusion portion formed in a shape in which the height sharply decreases at or near the end portions.

Additionally, the longitudinal protrusion portion 40 may be formed in a shape other than the shape (see FIG. 9) in which the height H decreases from the central portion 46 (see FIG. 3) toward the end portions 47 (see FIG. 3) in the length direction. FIGS. 12 and 13 are explanatory diagrams of modified examples of a pneumatic tire according to an embodiment with the longitudinal protrusion portion formed in a shape in which the height sharply decreases at or near the end portions. As illustrated in FIGS. 12 and 13, the longitudinal protrusion portion 40 may be formed such that the height H changes little from the central portion 46 to the vicinity of the end portions 47 in the length direction, then sharply decreases in the vicinity of the end portions 47.

Figure 14:
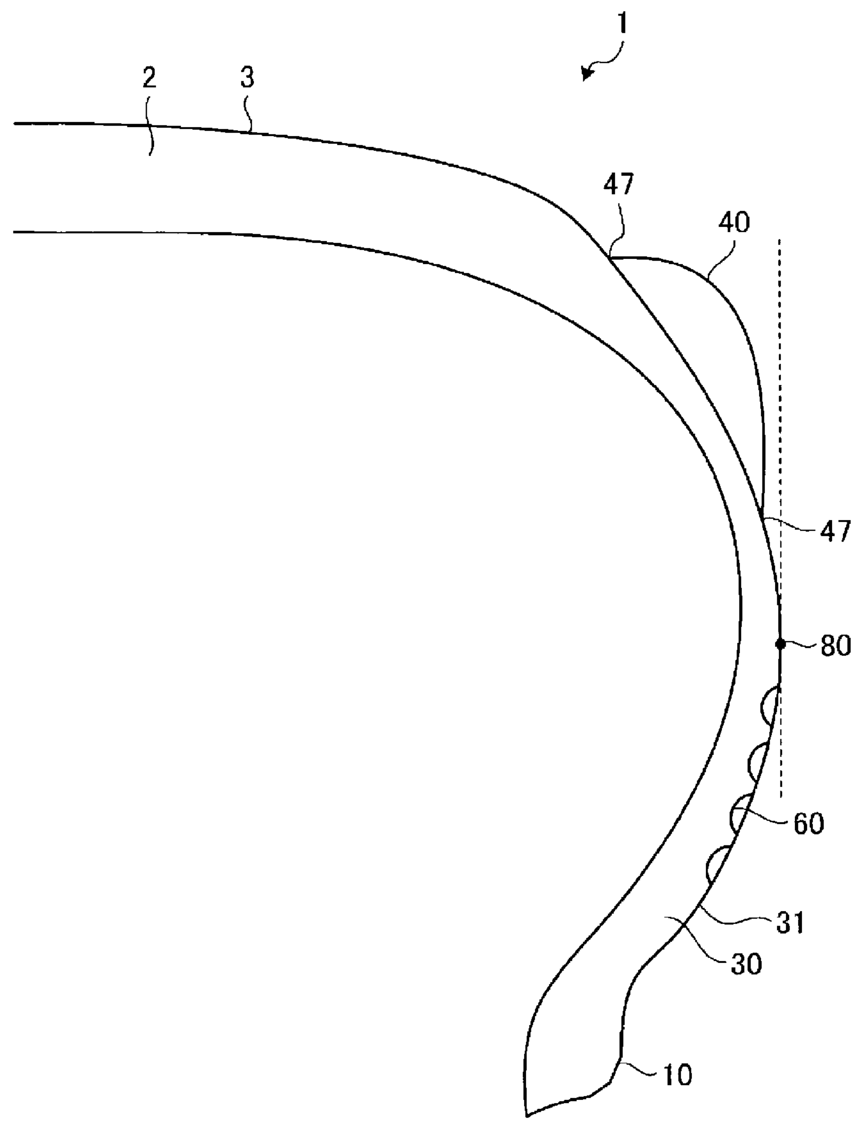
FIG. 14 is an explanatory diagram of a modified example of a pneumatic tire according to an embodiment with the longitudinal protrusion portion formed in a shape in which the greatest height is not at the central portion in the length direction.
Figure 15:
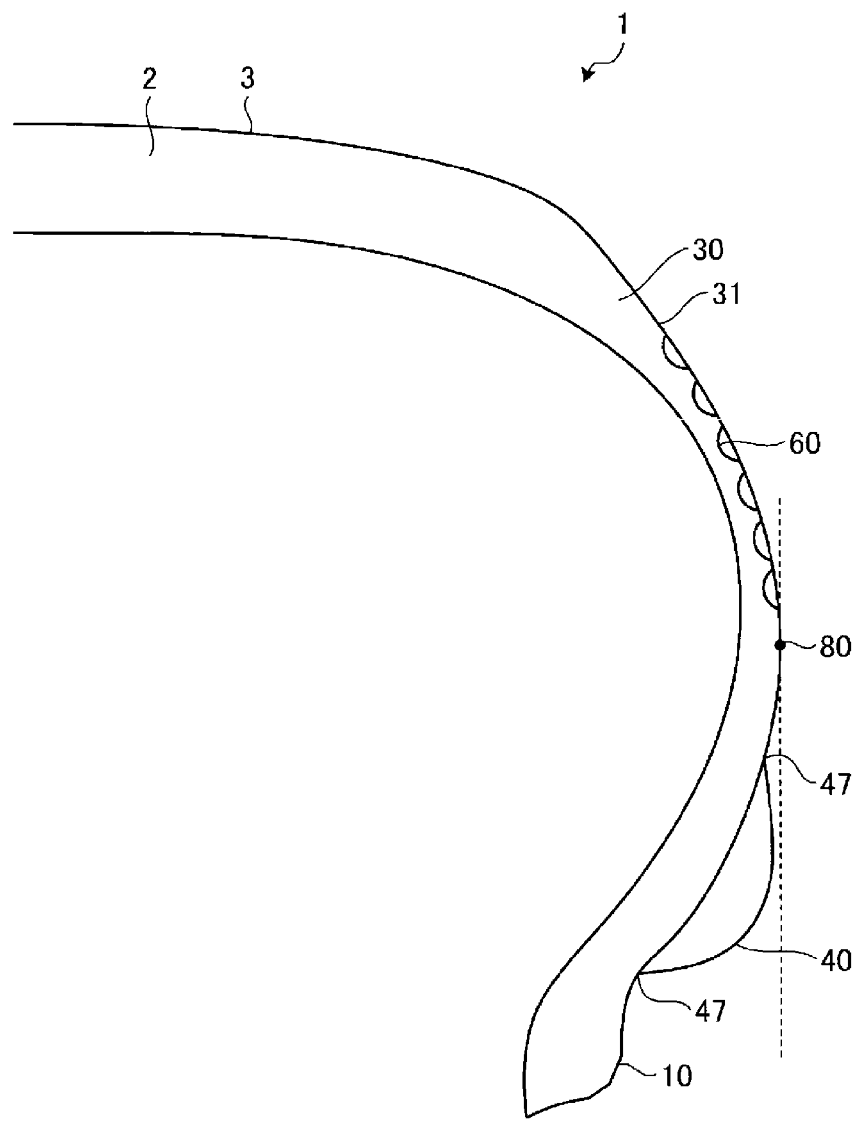
FIG. 15 is an explanatory diagram of a modified example of a pneumatic tire according to an embodiment with the longitudinal protrusion portion formed in a shape in which the greatest height is not at the central portion in the length direction.

FIGS. 14 and 15 are explanatory diagrams of modified examples of a pneumatic tire according to an embodiment with the longitudinal protrusion portion formed in a shape in which the greatest height is not at the central portion in the length direction. As illustrated in FIGS. 14 and 15, for example, the longitudinal protrusion portion 40 may be formed such that the portion of the longitudinal protrusion portion 40 with the greatest height H is located at a position other than at the central portion 46 in the length direction. Irrespective of the shape of the longitudinal protrusion portion 40, the portion of the longitudinal protrusion portion 40 projecting furthest outward in the tire lateral direction may be located inward of a tire maximum width position 80 in the tire lateral direction.

Figure 16:
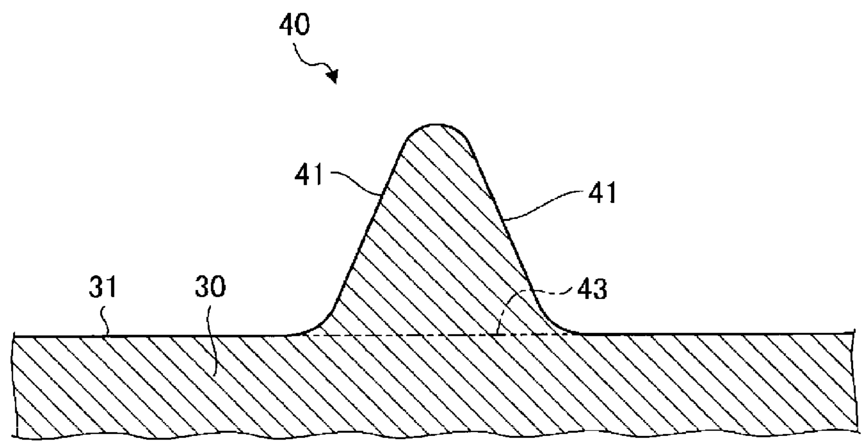
FIG. 16 is an explanatory diagram of a modified example of a pneumatic tire according to an embodiment with the longitudinal protrusion portion formed with the cross-sectional shape of a curvilinear triangle.
Figure 17:
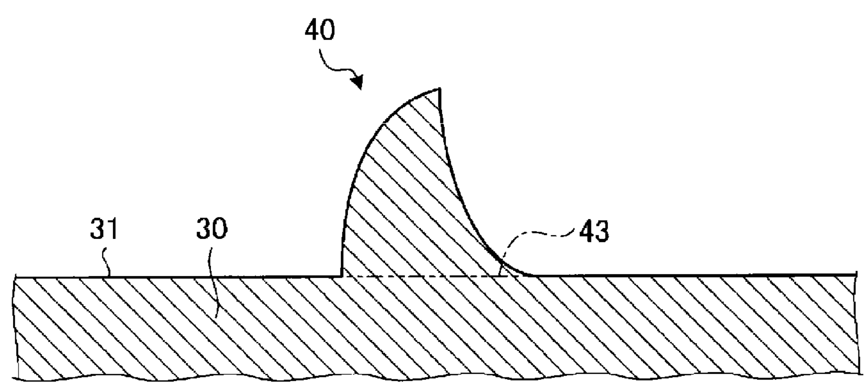
FIG. 17 is an explanatory diagram of a modified example of a pneumatic tire according to an embodiment with the longitudinal protrusion portion formed with the cross-sectional shape of a deformed triangle.

Additionally, the longitudinal protrusion portion 40 may have a cross-sectional shape as viewed in the length direction of the longitudinal protrusion portion 40 other than a triangular shape. FIG. 16 is an explanatory diagram of a modified example of a pneumatic tire according to an embodiment with the longitudinal protrusion portion formed with the cross-sectional shape of a curvilinear triangle. FIG. 17 is an explanatory diagram of a modified example of a pneumatic tire according to an embodiment with the longitudinal protrusion portion formed with the cross-sectional shape of a deformed triangle. As illustrated in FIG. 16, for example, the longitudinal protrusion portion 40 may be formed with the cross-sectional shape, as viewed in the length direction, of a curvilinear triangle with each corner portion rounded. Additionally, as illustrated in FIG. 17, the longitudinal protrusion portion 40 may have a deformed triangular shape with, of the two sides other than the bottom side 43 of the triangle, one side being curved outward of the triangle and the other side being curved inward of the triangle. Irrespective of the cross-sectional shape of the longitudinal protrusion portion 40 as viewed in the length direction of the longitudinal protrusion portion 40, by providing the serration 50 in the region including the end portion 47 of the longitudinal protrusion portion 40, crack growth at or near the end portion 47 of the longitudinal protrusion portion 40 can be suppressed.

Additionally, in the pneumatic tire 1 according to the embodiment described above, the serration 50 includes two regions, the first serration portion 55 and the second serration portion 56. However, the serration 50 may include three or more regions with small grooves 51 of different angles. By the serration 50 including a plurality of regions where the small grooves 51 have mutually different angles, crack growth generated at or near the end portion 47 of the longitudinal protrusion portion 40 can be more reliably suppressed.

In the pneumatic tire 1 according to the embodiment described above, the longitudinal protrusion portions 40 are provided on the tire side surface 31 located on the vehicle outer side when the pneumatic tire 1 is mounted on the vehicle 100. However, the longitudinal protrusion portions 40 may be provided on the both of the tire side surfaces 31 in the tire lateral direction.

Figure 18:
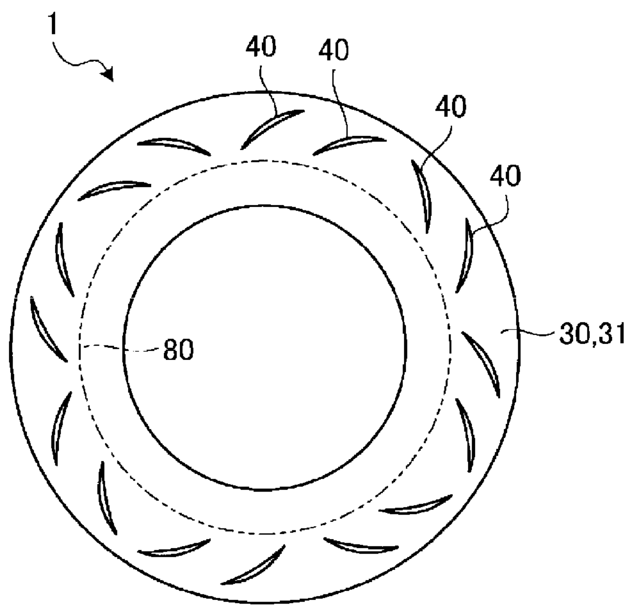
FIG. 18 is an explanatory diagram of a modified example of a pneumatic tire according to an embodiment in which two of each of the two types of longitudinal protrusion portions are formed consecutively.
Figure 19:
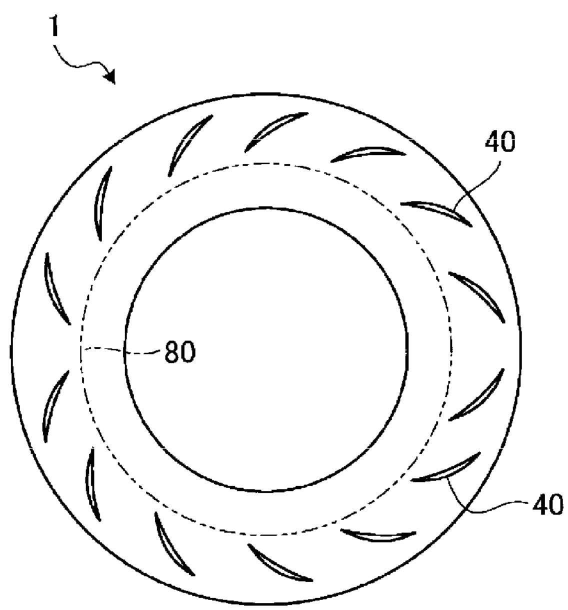
FIG. 19 is an explanatory diagram of a modified example of a pneumatic tire according to an embodiment in which the two types of longitudinal protrusion portions are formed in separate semicircular regions.

Additionally, in the pneumatic tire 1 according to the embodiment described above, the two types of longitudinal protrusion portions 40 with different angles with respect to the tire circumferential direction or the tire radial direction are alternately disposed in the tire circumferential direction. However, the longitudinal protrusion portions 40 may be provided in another configuration. FIG. 18 is an explanatory diagram of a modified example of a pneumatic tire according to an embodiment in which two of each of the two types of longitudinal protrusion portions are formed consecutively. FIG. 19 is an explanatory diagram of a modified example of a pneumatic tire according to an embodiment in which the two types of longitudinal protrusion portions are formed in separate semicircular regions. As illustrated in FIG. 18, for example, the plurality of longitudinal protrusion portions 40 include the two types of longitudinal protrusion portions 40, and two of the longitudinal protrusion portions 40 of the same inclination with respect to the tire circumferential direction and the tire radial direction may be formed side by side in the tire circumferential direction. Additionally, as illustrated in FIG. 19, the region in the tire circumferential direction may be divided into two semicircular regions, with the type of longitudinal protrusion portion 40 provided on the tire side surface 31, i.e., the inclination angle of the longitudinal protrusion portions 40 with respect to the tire circumferential direction and the tire radial direction, being different in each region. The two types of longitudinal protrusion portions 40 may be provided in the same number on the tire side surface 31.

EXAMPLES

FIGS. 20A and 20B are tables showing the results of performance tests of pneumatic tires according to embodiments. In relation to the pneumatic tire 1 described above, performance evaluation tests conducted on a pneumatic tire 1 of a Comparative Example and pneumatic tires 1 according to embodiments of the present technology will be described below. Performance evaluation tests for durability performance, visibility of the longitudinal protrusion portions 40, and air resistance reducing performance were performed.

In the performance evaluation tests, the pneumatic tires 1 having a size of 195/65R15 91H were mounted on rim wheels of a JATMA standard rim having a size of 15×6J and adjusted to an air pressure of 230 kPa. In the evaluation tests for durability performance, cracking resistance, which is the performance of the resistance to cracking or the resistance to crack growth, was evaluated. Cracking resistance is evaluated using an indoor drum test to measure the number of cracks after 50 hours of running under the conditions of 100 kPa air pressure, 80 km/h speed, 4.5 kN load, while exposing the pneumatic tire 1 to ozone of 100 pphm concentration from a position 10 mm from the tire side surface 31. The results of the number of cracks are expressed as integer values with Comparative Example 1 described below being assigned the value of 100. Larger values indicate a lower number of cracks and superior cracking resistance.

Visibility is evaluated by performing an evaluation test in which three testers visually evaluate the visibility of the longitudinal protrusion portions 40 of the pneumatic tires 1. The evaluation results are expressed as a score with Comparative Example 1 being assigned the score of 100. Larger values indicate superior visibility of the longitudinal protrusion portions 40. Air resistance reducing performance is evaluated by performing an evaluation test in accordance with the JIS (Japanese Industrial Standard) D1012 testing method on the pneumatic tires 1 mounted on a typical passenger vehicle. The results are expressed as integer values with Comparative Example 1 being assigned the value of 100. In the evaluation, larger values indicate less air resistance and superior air resistance reducing performance.

The evaluation tests were performed on two types of pneumatic tires 1 according to Comparative Examples 1 and 2, and eight types of pneumatic tires 1 according to Examples 1 to 8, which are pneumatic tires 1 according to embodiments of the present technology. In all of the pneumatic tires 1 used in the evaluation tests the longitudinal protrusion portions 40 are formed on the tire side surface 31. In the pneumatic tire 1 of Comparative Example 1, the serration 50 is not formed. In the pneumatic tire of Comparative Example 2, the first serration portion 55 of the serration 50 is formed. However, the angle formed by the longitudinal protrusion portion 40 and the small grooves 51 of the first serration portion 55 is 0°.

All of the pneumatic tires 1 according to Examples 1 to 8, which are pneumatic tires 1 according to examples of the present technology, include the first serration portion 55, and the small grooves 51 of the first serration portion 55 are inclined with respect to the longitudinal protrusion portion 40. Additionally, in Examples 1 to 8, the presence of the second serration portion 56, the presence of the recessed portions 60, whether the longitudinal protrusion portion 40 has an arc shape, whether the longitudinal protrusion portions 40 are disposed outward or inward of the tire maximum width position 80 in the tire radial direction, whether the longitudinal protrusion portion 40 has the maximum width at the central portion 46 and the minimum width at the end portions 47 are varied.

As shown in FIGS. 20A and 20B, it can be seen from the results of the evaluation tests using the pneumatic tires 1 that the pneumatic tires 1 of Examples 1 to 8 provide improved durability performance, visibility, and air resistance reducing performance compared to the pneumatic tires 1 of Comparative Examples 1 and 2. In other words, the pneumatic tires 1 of Examples 1 to 8 can suppress crack growth.

The invention claimed is:

1. A pneumatic tire, comprising:

a longitudinal protrusion portion provided on at least one of tire side surfaces located on either side in a tire lateral direction, the longitudinal protrusion portion projecting from the at least one of tire side surfaces and extending along the at least one of tire side surfaces; and serration provided on the at least one of tire side surfaces in a region including an end portion of the longitudinal protrusion portion, the serration being formed of a plurality of small grooves arranged in parallel, and the plurality of small grooves being inclined with respect to a lateral centerline that passes through a center of the longitudinal protrusion portion in a width direction; wherein the plurality of small grooves that form the serration have a groove depth in a range of from 0.1 mm to 0.8 mm, a groove width in a range of from 0.1 mm to 0.8 mm, and an interval between adjacent small grooves of the plurality of small grooves in a range of from 0.3 mm to 1.0 mm;

a greatest height of the longitudinal protrusion portion being in a range of from 1.9 mm to 10.0 mm;

the longitudinal protrusion portion has a cross-sectional shape of a triangle as viewed in an extension direction of the longitudinal protrusion portion, and a length of a bottom side corresponding to a side of the triangle proximal to the at least one of tire side surfaces has a maximum length at a central portion of the longitudinal protrusion portion in the extension direction and has a minimum length at the end portion of the longitudinal protrusion portion.

2. The pneumatic tire according to claim 1, wherein the serration comprises a plurality of regions where the plurality of small grooves have mutually different angles.

3. The pneumatic tire according to claim 1, wherein the lateral centerline of the longitudinal protrusion portion intersects a tire circumferential direction line and a tire radial direction line.

4. The pneumatic tire according to claim 1, wherein the lateral centerline of the longitudinal protrusion portion is formed in an arc shape.

5. The pneumatic tire according to claim 1, wherein the longitudinal protrusion portion comprises two types of the longitudinal protrusion portions having different angles with respect to a tire circumferential direction or a tire radial direction and alternately disposed in the tire circumferential direction.

6. The pneumatic tire according to claim 1, wherein a portion of the longitudinal protrusion portion that projects furthest outward in the tire lateral direction is located outward of a tire maximum width position in the tire radial direction, and inward of the tire maximum width position in the tire lateral direction in a case that the pneumatic tire is mounted on a regular rim, inflated to a regular internal pressure, and in an unloaded state; further comprising a plurality of recessed portions provided in the at least one of tire side surfaces at a position inward of the tire maximum width position in the tire radial direction.

7. The pneumatic tire according to claim 1, wherein a portion of the longitudinal protrusion portion that projects furthest outward in the tire lateral direction is located inward of a tire maximum width position in the tire radial direction, and inward of the tire maximum width position in the tire lateral direction in a case that the pneumatic tire is mounted on a regular rim, inflated to a regular internal pressure, and in an unloaded state; further comprising a plurality of recessed portions provided on the at least one of tire side surfaces at a position outward of the tire maximum width position in the tire radial direction.

8. The pneumatic tire according to claim 1, wherein a vehicle inner/outer orientation in a case that the pneumatic tire is mounted on a vehicle is designated; and the longitudinal protrusion portion is at least provided on the at least one of tire side surfaces on a vehicle outer side.

9. The pneumatic tire according to claim 2, wherein the lateral centerline of the longitudinal protrusion portion intersects a tire circumferential direction line and a tire radial direction line.

10. The pneumatic tire according to claim 9, wherein the lateral centerline of the longitudinal protrusion portion is formed in an arc shape.

11. The pneumatic tire according to claim 10, wherein the longitudinal protrusion portion comprises two types of the longitudinal protrusion portions having different angles with respect to a tire circumferential direction or a tire radial direction and alternately disposed in the tire circumferential direction.

12. The pneumatic tire according to claim 11, wherein a portion of the longitudinal protrusion portion that projects furthest outward in the tire lateral direction is located outward of a tire maximum width position in the tire radial direction, and inward of the tire maximum width position in the tire lateral direction in a case that the pneumatic tire is mounted on a regular rim, inflated to a regular internal pressure, and in an unloaded state; further comprising a plurality of recessed portions provided in the at least one of tire side surfaces at a position inward of the tire maximum width position in the tire radial direction.

13. The pneumatic tire according to claim 11, wherein a portion of the longitudinal protrusion portion that projects furthest outward in the tire lateral direction is located inward of a tire maximum width position in the tire radial direction, and inward of the tire maximum width position in the tire lateral direction in a case that the pneumatic tire is mounted on a regular rim, inflated to a regular internal pressure, and in an unloaded state; further comprising a plurality of recessed portions provided on the at least one of tire side surfaces at a position outward of the tire maximum width position in the tire radial direction.

14. The pneumatic tire according to claim 13, wherein a vehicle inner/outer orientation in a case that the pneumatic tire is mounted on a vehicle is designated; and the longitudinal protrusion portion is at least provided on the at least one of tire side surfaces on a vehicle outer side.

15. The pneumatic tire according to claim 1, wherein the greatest height of the longitudinal protrusion portion from the tire side surface is at or near a central portion, and a smallest height of the longitudinal protrusion portion is at the end portions, the smallest height being smaller than the greatest height.

* * * * *